United States Patent
Yerramalli et al.

(10) Patent No.: US 11,064,439 B2
(45) Date of Patent: Jul. 13, 2021

(54) ASYNCHRONOUS CARRIER AGGREGATION

(71) Applicant: QUALCOMM Incorporated, San Diego, CA (US)

(72) Inventors: Srinivas Yerramalli, San Diego, CA (US); Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/153,166

(22) Filed: Oct. 5, 2018

(65) Prior Publication Data
US 2019/0110254 A1    Apr. 11, 2019

Related U.S. Application Data

(60) Provisional application No. 62/569,826, filed on Oct. 9, 2017.

(51) Int. Cl.
  *H04W 52/02* (2009.01)
  *H04W 56/00* (2009.01)
  (Continued)

(52) U.S. Cl.
  CPC ......... *H04W 52/0251* (2013.01); *H04L 1/001* (2013.01); *H04L 5/001* (2013.01);
  (Continued)

(58) Field of Classification Search
  None
  See application file for complete search history.

(56) References Cited

U.S. PATENT DOCUMENTS 9,788,191 B2 * 10/2017 Uchino ................. H04L 5/0094
2016/0204927 A1   7/2016 Yi et al.
(Continued)

FOREIGN PATENT DOCUMENTS

WO    WO-2016182692 A1    11/2016

OTHER PUBLICATIONS

International Search Report and Written Opinion—PCT/US2018/054875—ISA/EPO—dated Jan. 17, 2019.

*Primary Examiner* — Willie J Daniel, Jr.
(74) *Attorney, Agent, or Firm* — Holland & Hart LLP/Qualcomm

(57) ABSTRACT

Methods, systems, and devices for wireless communications are described that asynchronous carrier aggregation, including between high frequency band and lower frequency band transmissions. A user equipment (UE) may be configured to monitor transmissions in a first frequency band and a second frequency band. The UE may measure a timing difference between transmissions in the first frequency band and one or more of the transmissions in the second frequency band, and transmit an indication of the timing difference to a base station. The base station may use the timing difference to determine whether the UE is to use asynchronous carrier aggregation. If the base station determines that the UE is to use asynchronous carrier aggregation, the base station may configure the UE to observe at least a minimum amount of delay when conducting uplink signaling via one of the frequency bands.

30 Claims, 18 Drawing Sheets

(51) Int. Cl.
  *H04L 5/00*   (2006.01)
  *H04W 72/04*  (2009.01)
  *H04L 27/26*   (2006.01)
  *H04L 1/00*   (2006.01)
  *H04W 24/10*  (2009.01)

(52) U.S. Cl.
  CPC ........ *H04L 5/0051* (2013.01); *H04L 27/2602* (2013.01); *H04L 27/2646* (2013.01); *H04L 27/2655* (2013.01); *H04W 56/001* (2013.01); *H04W 72/0446* (2013.01); *H04L 5/0055* (2013.01); *H04L 5/0057* (2013.01); *H04W 24/10* (2013.01); *H04W 56/0065* (2013.01); *H04W 72/0413* (2013.01)

(56) References Cited

U.S. PATENT DOCUMENTS

| | | | |
|---|---|---|---|
| 2017/0013564 A1* | 1/2017 | Yi | H04W 52/36 |
| 2018/0083748 A1* | 3/2018 | Tang | H04L 5/001 |
| 2018/0146444 A1* | 5/2018 | Chen | H04W 72/0413 |

* cited by examiner

ASYNCHRONOUS CARRIER AGGREGATION

CROSS REFERENCES

The present Application for Patent claims the benefit of U.S. Provisional Patent Application No. 62/569,826 by YERRAMALLI, et al., entitled "ASYNCHRONOUS CARRIER AGGREGATION," filed Oct. 9, 2017, assigned to the assignee hereof, and expressly incorporated herein by reference in its entirety.

BACKGROUND

The following relates generally to wireless communication, and more specifically to asynchronous carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, or power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some systems, multiple connections may be established between a UE and one or more base stations. In some cases, a low band connection may be made using a relatively low frequency carrier, and a high band connection may be made using a relatively high frequency carrier. In some deployments, a low band carrier and a high band carrier may not be time synchronized with one another—e.g., a first base station may support the low band carrier, and a second base station may support the high band carrier, and transmissions to or from the first base station may not be time synchronized with transmissions to or from the second base station. Efficient techniques for communicating on asynchronous carriers may be desirable.

SUMMARY

The described techniques relate to improved methods, systems, devices, or apparatuses that support carrier aggregation (CA) using asynchronous carriers. Generally, the described techniques provide for monitoring, at a user equipment (UE), transmissions in a first frequency band and a second frequency band, the second frequency band at a higher frequency than the first frequency band. The UE may establish a connection using a first carrier in the first frequency band, and the UE may measure a timing difference between transmissions in the first frequency band and one or more of the transmissions in the second frequency band. The UE may transmit an indication of the timing difference to a base station, and the base station may determine a connectivity mode that the UE is to use to establish a connection using a second carrier in the second frequency band based, at least in part, on the timing difference. For example, the base station may use the timing difference to determine whether the UE is to use a dual connectivity mode, a synchronous CA mode, or an asynchronous CA mode to establish a connection using the second carrier in the second frequency band.

If the base station determines that the UE is to use an asynchronous CA mode, the base station may configure the UE to observe at least a minimum amount of reporting delay between receiving a downlink transmission via the second carrier and sending a related uplink transmission via the first carrier. For example, the base station may configure the UE to observe at least a minimum amount of delay between receiving a packet via the second carrier and reporting (e.g., transmitting) an acknowledgement for the packet via the first carrier. As another example, the base station may configure the UE to observe at least a minimum amount of delay between receiving a packet via the second carrier and reporting (e.g., transmitting) channel state information (CSI) corresponding to the packet via the first carrier.

A method of wireless communication is described. The method may include establishing a first connection with a UE using a first carrier in a first frequency band, receiving, from the UE, a timing difference between transmissions in the first frequency band and one or more transmissions in a second frequency band that is higher than the first frequency band, and determining that the UE is to use an asynchronous carrier aggregation mode for communications using a second carrier in the second frequency band based at least in part on the timing difference.

An apparatus for wireless communication is described. The apparatus may include means for establishing a first connection with a UE using a first carrier in a first frequency band, receiving, from the UE, a timing difference between transmissions in the first frequency band and one or more transmissions in a second frequency band that is higher than the first frequency band, and determining that the UE is to use an asynchronous carrier aggregation mode for communications using a second carrier in the second frequency band based at least in part on the timing difference.

Another apparatus for wireless communication is described. The apparatus may include a processor, memory in electronic communication with the processor, and instructions stored in the memory. The instructions may be operable to cause the processor to establish a first connection with a UE using a first carrier in a first frequency band, receive from the UE, a timing difference between transmissions in the first frequency band and one or more transmissions in a second frequency band that is higher than the first frequency band, and determine that the UE is to use an asynchronous carrier aggregation mode for communications using a second carrier in the second frequency band based at least in part on the timing difference.

A non-transitory computer readable medium for wireless communication is described. The non-transitory computer-readable medium may include instructions operable to cause a processor to establish a first connection with a UE using a first carrier in a first frequency band, receive from the UE, a timing difference between transmissions in the first frequency band and one or more transmissions in a second frequency band that is higher than the first frequency band, and determine that the UE is to use an asynchronous carrier aggregation mode for communications using a second carrier in the second frequency band based at least in part on the timing difference.

Some examples of the method, apparatus, and non-transitory computer-readable medium described above may further include processes, features, means, or instructions for configuring the UE, based at least in part on the determination that the UE is to use the asynchronous carrier aggregation mode, to observe at least a minimum delay between receiving a packet via the second carrier and reporting an acknowledgement for the packet via the first carrier. Some examples of the method, apparatus, and non-transitory computer-readable medium described above may further include processes, features, means, or instructions for determining the minimum delay based at least in part on the timing difference, a first subcarrier spacing associated with the first carrier, a second subcarrier spacing associated with the second carrier, or any combination thereof.

In some examples of the method, apparatus, and non-transitory computer-readable medium described above, the timing difference may include a timing offset between a first reference slot on the first carrier and a second reference slot on the second carrier, and the method, apparatus, and non-transitory computer-readable medium described above may further include processes, features, means, or instructions for determining the minimum delay based at least in part on the timing difference, a first slot duration for the first carrier, a second slot duration for the second carrier, an uplink timing advance for the first carrier, a duration of an uplink portion of a slot in the first carrier, a processing time for the packet, or any combination thereof.

In some examples of the method, apparatus, and non-transitory computer-readable medium described above, the timing difference may include a timing offset between a first reference slot on the first carrier and a second reference slot on the second carrier, and the method, apparatus, and non-transitory computer-readable medium described above may further include processes, features, means, or instructions for applying a floor function to a quantity based at least in part on the timing difference, a first slot duration for the first carrier, a second slot duration for the second carrier, an uplink timing advance for the first carrier, a duration of an uplink portion of a slot in the first carrier, a processing time for the packet, or any combination thereof, and configuring an acknowledgement reporting parameter for the UE based at least in part on an output of the floor function. In some examples, the second slot duration for the second carrier is for a downlink portion of a slot in the second carrier. In some examples, the duration of the uplink portion of the slot in the first carrier is based at least in part on an amount of uplink data to be transmitted in the slot in the first carrier.

Some examples of the method, apparatus, and non-transitory computer-readable medium described above may further include processes, features, means, or instructions for configuring the UE to report the acknowledgement via a physical uplink shared channel (PUSCH) or a physical uplink control channel (PUCCH).

Some examples of the method, apparatus, and non-transitory computer-readable medium described above may further include processes, features, means, or instructions for configuring the UE to observe at least the minimum delay at least in part using a radio resource control (RRC) protocol.

Some examples of the method, apparatus, and non-transitory computer-readable medium described above may further include processes, features, means, or instructions for receiving, from the UE, an updated timing difference, and configuring the UE to observe at least an updated minimum delay between receiving a subsequent packet via the second carrier and reporting an acknowledgement for the subsequent packet via the first carrier.

In some examples of the method, apparatus, and non-transitory computer-readable medium described above, the timing difference may include a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof.

Some examples of the method, apparatus, and non-transitory computer-readable medium described above may further include processes, features, means, or instructions for configuring the UE, based at least in part on the determination that the UE is to use the asynchronous carrier aggregation mode, to observe at least a minimum delay between receiving a packet via the second carrier and reporting CSI corresponding to the packet via the first carrier.

In some examples of the method, apparatus, and non-transitory computer-readable medium described above, determining that the UE is to use the asynchronous carrier aggregation mode for communications using the second carrier in the second frequency band based at least in part on the timing difference may include comparing the timing difference to a threshold timing difference. Some examples of the method, apparatus, and non-transitory computer-readable medium described above may further include processes, features, means, or instructions for determining the threshold timing difference based at least in part on a subcarrier spacing associated with either the first frequency band or the second frequency band.

In some examples of the method, apparatus, and non-transitory computer-readable medium described above, determining that the UE is to use the asynchronous carrier aggregation mode for communications using the second carrier in the second frequency band is further based at least in part on a frequency difference between the first frequency band and the second frequency band.

In some examples, determining that the UE is to use the asynchronous carrier aggregation mode for communications using the second carrier in the second frequency band is further based at least in part on whether the UE is able to establish an uplink connection on the second carrier. Some examples of the method, apparatus, and non-transitory computer-readable medium described above may further include processes, features, means, or instructions for comparing a channel quality metric for the second carrier to a threshold value in order to determine whether the UE is able to establish the uplink connection on the second carrier. Some examples of the method, apparatus, and non-transitory computer-readable medium described above may further include processes, features, means, or instructions for receiving from the UE an indication of whether the UE is able to establish the uplink connection on the second carrier. Some examples of the method, apparatus, and non-transitory computer-readable medium described above may further include processes, features, means, or instructions for configuring the UE to attempt a random access procedure via the second carrier using a specified transmit power in order to determine whether the UE is able to establish the uplink connection on the second carrier.

In some examples of the method, apparatus, and non-transitory computer-readable medium described above, determining that the UE is to use the asynchronous carrier aggregation mode for communications using the second carrier in the second frequency band based at least in part on the timing difference may include determining whether the second carrier may be aggregated with the first carrier. In some examples, determining whether the second carrier may be aggregated with the first carrier may include determining a quality of a backhaul connection between a first base station corresponding to the first carrier and a second base station corresponding to the second carrier.

A method of wireless communication is described. The method may include establishing a first connection with a base station using a first carrier in a first frequency band, monitoring one or more transmissions in a second frequency band, the second frequency band at a higher frequency than the first frequency band, measuring a timing difference between transmissions in the first frequency band and one or more of the transmissions in the second frequency band, transmitting an indication of the timing difference to the base station, and receiving from the base station an indication to use an asynchronous carrier aggregation mode for communications with a second carrier in the second frequency band.

An apparatus for wireless communication is described. The apparatus may include means for establishing a first connection with a base station using a first carrier in a first frequency band, monitoring one or more transmissions in a second frequency band, the second frequency band at a higher frequency than the first frequency band, measuring a timing difference between transmissions in the first frequency band and one or more of the transmissions in the second frequency band, transmitting an indication of the timing difference to the base station, and receiving from the base station an indication to use an asynchronous carrier aggregation mode for communications with a second carrier in the second frequency band.

Another apparatus for wireless communication is described. The apparatus may include a processor, memory in electronic communication with the processor, and instructions stored in the memory. The instructions may be operable to cause the processor to establish a first connection with a base station using a first carrier in a first frequency band, monitor one or more transmissions in a second frequency band, the second frequency band at a higher frequency than the first frequency band, measure a timing difference between transmissions in the first frequency band and one or more of the transmissions in the second frequency band, transmit an indication of the timing difference to the base station, and receive from the base station an indication to use an asynchronous carrier aggregation mode for communications with a second carrier in the second frequency band.

A non-transitory computer readable medium for wireless communication is described. The non-transitory computer-readable medium may include instructions operable to cause a processor to establish a first connection with a base station using a first carrier in a first frequency band, monitor one or more transmissions in a second frequency band, the second frequency band at a higher frequency than the first frequency band, measure a timing difference between transmissions in the first frequency band and one or more of the transmissions in the second frequency band, transmit an indication of the timing difference to the base station, and receive from the base station an indication to use an asynchronous carrier aggregation mode for communications with a second carrier in the second frequency band.

Some examples of the method, apparatus, and non-transitory computer-readable medium described above may further include processes, features, means, or instructions for receiving from the base station a minimum delay to observe between receiving a packet via the second carrier and reporting an acknowledgement for the packet via the first carrier.

Some examples of the method, apparatus, and non-transitory computer-readable medium described above may further include processes, features, means, or instructions for transmitting, to the base station, an updated timing difference, and receiving from the base station an updated minimum delay to observe between receiving a subsequent packet via the second carrier and reporting an acknowledgement for the subsequent packet via the first carrier.

Some examples of the method, apparatus, and non-transitory computer-readable medium described above may further include processes, features, means, or instructions for measuring an uplink timing advance for the first carrier, and transmitting an indication of the uplink timing advance to the base station.

Some examples of the method, apparatus, and non-transitory computer-readable medium described above may further include processes, features, means, or instructions for measuring a processing time for the packet, and transmitting an indication of the processing time to the base station.

Some examples of the method, apparatus, and non-transitory computer-readable medium described above may further include processes, features, means, or instructions for measuring a second slot duration for the second carrier, and transmitting an indication of the second slot duration for the second carrier to the base station. Some examples of the method, apparatus, and non-transitory computer-readable medium described above may further include processes, features, means, or instructions for measuring at least one of an uplink timing advance for the first carrier, a processing time for the packet, or a second slot duration for the second carrier, and transmitting an indication of at least one of the uplink timing advance, the processing time, or the second slot duration for the second carrier, to the base station.

Some examples of the method, apparatus, and non-transitory computer-readable medium described above may further include processes, features, means, or instructions for reporting the acknowledgement via a PUSCH or a PUCCH.

Some examples of the method, apparatus, and non-transitory computer-readable medium described above may further include processes, features, means, or instructions for receiving the minimum delay at least in part via an RRC protocol.

In some examples of the method, apparatus, and non-transitory computer-readable medium described above, the timing difference may include a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof.

Some examples of the method, apparatus, and non-transitory computer-readable medium described above may further include processes, features, means, or instructions for receiving from the base station a second minimum delay to observe between receiving a packet via the second carrier and reporting CSI corresponding to the packet via the first carrier.

In some examples of the method, apparatus, and non-transitory computer-readable medium described above, measuring the timing difference may include deriving the timing difference based at least in part on a common timing reference used to measure timing of transmissions of both the first frequency band and the second frequency band.

Some examples of the method, apparatus, and non-transitory computer-readable medium described above may further include processes, features, means, or instructions for measuring the timing difference in terms of a sampling rate associated with the second frequency band.

Some examples of the method, apparatus, and non-transitory computer-readable medium described above may further include processes, features, means, or instructions for transmitting to the base station a channel quality metric for the second carrier.

Some examples of the method, apparatus, and non-transitory computer-readable medium described above may further include processes, features, means, or instructions for transmitting to the base station an indication of whether the uplink connection on the second carrier is able to be established. Some examples of the method, apparatus, and non-transitory computer-readable medium described above may further include processes, features, means, or instructions for determining whether the uplink connection on the second carrier is able to be established based at least in part on comparing a radio frequency exposure level associated with the uplink connection on the second carrier to a maximum permissible exposure level. Some examples of the method, apparatus, and non-transitory computer-readable medium described above may further include processes, features, means, or instructions for determining whether the uplink connection on the second carrier is able to be established based at least in part on comparing a battery charge level associated with a UE to a minimum battery charge level. Some examples of the method, apparatus, and non-transitory computer-readable medium described above may further include processes, features, means, or instructions for receiving from the base station a specified transmit power, attempting a random access procedure via the second carrier using the specified transmit power, and determining whether the uplink connection on the second carrier is able to be established based at least in part on whether the random access procedure is successful. Some examples of the method, apparatus, and non-transitory computer-readable medium described above may further include processes, features, means, or instructions for determining whether the uplink connection on the second carrier is able to be established based at least in part on at least one of comparing a radio frequency exposure level associated with the uplink connection on the second carrier to a maximum permissible exposure level, or comparing a battery charge level associated with a UE to a minimum battery charge level In some examples of the method, apparatus, and non-transitory computer-readable medium described above, the indication of the timing difference is transmitted in a medium access control (MAC) control element (MAC-CE) or in an RRC measurement report.

DETAILED DESCRIPTION

Figure 1:
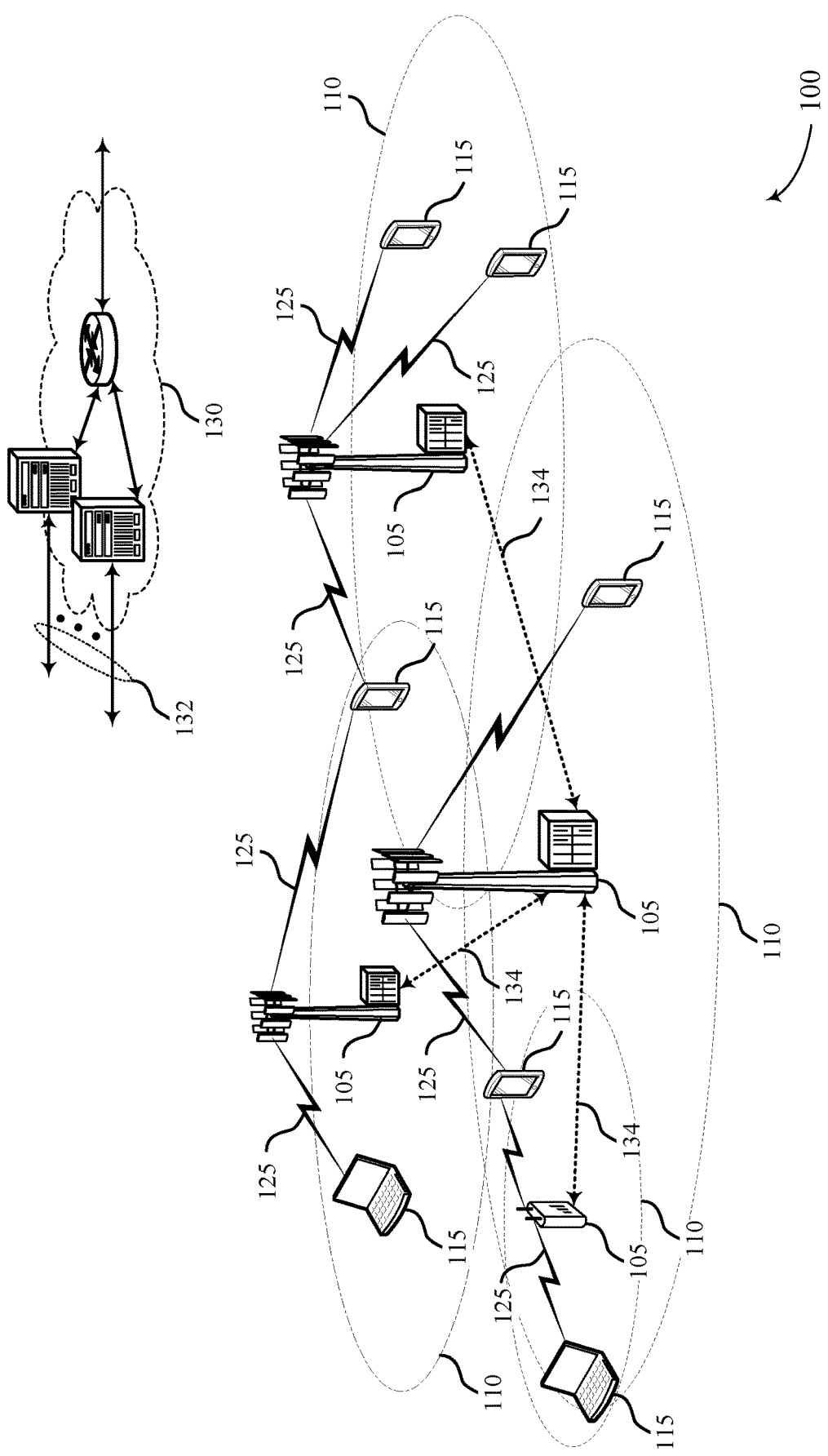
FIG. 1 illustrates an example of a system for wireless communication that supports asynchronous carrier aggregation (CA) in accordance with aspects of the present disclosure.

Various described techniques provide for determining whether a user equipment (UE) is to use carrier aggregation (CA) and, if so, for implementing asynchronous CA. In some cases, the UE may establish a connection using a first carrier in a first frequency band, and the UE may measure a timing difference between transmissions in the first frequency band and one or more of the transmissions in a second frequency band. The second frequency band may be relatively higher than the first frequency band. The UE may transmit an indication of the timing difference to a base station, and the base station may determine a connectivity mode that the UE is to use to establish a connection using a second carrier in the second frequency band based, at least in part, on the timing difference. For example, the base station may use the timing difference to determine whether the UE is to use a dual connectivity mode, a synchronous CA mode, or an asynchronous CA mode to establish a connection using the second carrier in the second frequency band. If the base station determines that the UE is to use an asynchronous CA mode, the base station may configure the UE to utilize at least a minimum amount of reporting delay between receiving data via the second carrier and transmitting an acknowledgement of the data via the first carrier.

As indicated above, in some cases two or more carriers may be established between a UE and one or more base stations. For example, a first carrier may be established in a low frequency band (e.g., a 600 MHz or lower frequency band), which may be referred to as a low band carrier, and a second carrier may be established in a high frequency band (e.g., a 4 GHz or higher frequency band, or a millimeter wave (mmW) frequency band), which may be referred to as a high band carrier. In some LTE and NR communications systems (e.g., licensed LTE and NR communications systems), signaling and feedback in a CA connectivity mode is made using the assumption that aggregated carriers are time synchronized.

In some deployments, however, the assumption that different carriers are time synchronized may not hold. For example, in some deployments, unlicensed or shared radio frequency spectrum may be used for one or more component carriers (CCs) or enhanced component carriers (eCCs), and in some cases base stations may be operated in a non-operator deployment in which not all base stations are operated by a mobile network operator (MNO) or by the same MNO. Furthermore, in some cases, base stations supporting high band carriers may be located indoors, and may not have reliable access to another system that may provide timing synchronization (e.g., global positioning system (GPS) signals may not be able to be reliably received). Additionally or alternatively, in some cases backhaul communications between base stations may not be reliably used for timing synchronization due to unpredictable latency between clock sources of the base stations. In some cases, the source clocks at the low band carrier and the high band carrier may not meet a latency requirement under one or more synchronization protocols (e.g., IEEE 1588). In some cases, the high band carrier may operate at in a low power mode or be turned off completely due to maximum permissible exposure requirement (e.g., when a human hand is detected at or near the communication path of the high band carrier). And in some cases, the low band carrier or high band carrier may be turned off in order to reduce interference.

As a further example, in some cases, a UE may have a low band connection with a base station or cell, which may be an anchor carrier connection. In some cases, the low band cell may provide umbrella low band connectivity for multiple high band cells (e.g., mmW cells). Due to attenuation and directional transmissions of transmissions of the high band cells, in some cases the high band cells may not detect transmissions of the other high band cells. Also, in some cases, the low band cell may be able to detect transmissions of other low band cells, which may be sufficiently synchronized for low band transmissions, but due to a relative increase of timing precision at higher frequencies, such low band synchronization may not provide sufficient precision for synchronization of high band cells that may be collocated with the low band cells. For example, low band and high band transmissions may use different subcarrier spacing (SCS) and different timing requirements. Thus, if a low band carrier is synchronized within plus or minus two microseconds, such a timing difference may equate to an offset of one or more orthogonal frequency division multiplexing (OFDM) symbols in a high band carrier (e.g., a high band carrier with 480 kHz tone spacing would have a 1 OFDM symbol offset at a timing difference of +/−2 µs, and a high band carrier with a 960 kHz tone spacing would have a 2 OFDM symbol offset at a timing difference of +/−2 µs). Additionally, even if two cells are synchronized, they may lose synchronization over time (e.g., due to oscillator drift).

Beneficially, the asynchronous CA techniques provided herein do not rely on an assumption that different carriers are time synchronized. Thus, the techniques described herein may provide the advantages of CA in deployments in which different carriers may not be time synchronized (e.g., carriers supported by two or more base stations or corresponding to different frequency bands may not be synchronized within a predictable latency, such as that required by a synchronization protocol such as IEEE 1588). A UE may measure a timing difference between transmissions at two different frequencies (e.g., low band transmissions and high band transmissions) and report the timing difference. For example, the UE may measure the timing difference between a reference timing unit (e.g., subframe, slot, etc.) of the low band carrier and a reference timing unit (e.g., subframe, slot, etc.) of the high band carrier. In some cases, the UE may also measure one or more channel quality metrics (e.g., a reference signal received power (RSRP), a reference signal received quality (RSRQ), a channel quality indicator (CQI), etc.) or one or more beam management parameters of the high band carrier and report the channel quality metrics or beam management parameters with cell identifiers (IDs) of the high band carrier. The UE may then transmit the measured timing offset, the cell IDs, and the channel quality report to the base station. In some examples, the low band carrier and the high band carrier may be considered aggregated carriers. For example, acknowledgements, CQI, beam management parameters, or other uplink signals and information associated with the high band carrier may be transmitted on the low band carrier—in some cases, such uplink signals may instead be transmitted on PUSCH on the high band carrier (e.g., in a dual connectivity mode). A base station that receives the timing difference may, based at least in part on the timing difference, determine whether the UE is to use asynchronous CA (as opposed to, e.g., synchronous CA or dual connectivity with independent uplink and downlink connections on each carrier).

For example, the base station may determine that the UE is to use asynchronous CA based at least in part on comparing the timing difference to a threshold timing difference, which may in part depend on an SCS of the different transmissions. The base station may also determine that the UE is to use asynchronous CA based at least in part on a frequency difference between two candidate carriers, including whether the carriers are part of a single band. The base station may also determine that the UE is to use asynchronous CA based at least in part on whether the UE is able to establish an uplink connection on one of the carriers. The base station may also determine that the UE is to use asynchronous CA based at least in part on whether the different carriers belong to base stations that support aggregation with one another—e.g., whether a backhaul between the corresponding base stations is of sufficient quality to support CA.

If the base station determines that the UE is to use asynchronous CA, the base station may configure the UE to utilize at least a minimum amount of delay between receiving downlink transmissions via a second carrier (e.g., a high band carrier) and sending related uplink transmissions via a first carrier (e.g., a low band carrier). For example, the base station may configure the UE to observe at least a minimum reporting delay between receiving a packet via the second carrier and reporting an acknowledgement for the packet via the first carrier. The base station may determine the amount of minimum reporting delay, at least in part, on the SCS of the first carrier and the timing difference between the two carriers. The UE may thereafter continue to monitor the timing difference and update the one or more base stations that support the aggregated carriers if the timing difference drifts over time, in which case the one or more base stations may update the minimum reporting delay that the UE is to use. The base station may similarly configure the UE to observe at least minimum delays when conducting other uplink signaling via the first carrier, such as channel state information (CSI), beam management information, power control information, and the like.

The UE may derive timing differences based at least in part on a common timing reference used to measure timing of transmissions of both the high band and the low band transmissions. In some cases, the UE may measure and report timing differences in terms of a sampling rate associated with the high band transmissions. The UE may provide reports including measured timing differences, for example, in a medium access control (MAC) control element (CE) or in a radio resource control (RRC) measurement report.

Aspects of the disclosure are initially described in the context of a wireless communications system. Various timing aspects and process flows are then described. Aspects of the disclosure are further illustrated by and described with reference to apparatus diagrams, system diagrams, and flowcharts that relate to asynchronous CA.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In some cases, one or more UEs 115 may provide indications of timing differences between carriers to one or more base stations 105, and, based at least in part on the indicated timing differences, base stations 105 may determine that UEs 115 are to establish communications on multiple carriers using asynchronous CA. Base stations 105 may also configure UEs 115 to use asynchronous CA, at least in part, by configuring the UEs 115 to observe at least a minimum amount of delay in conducting uplink signaling via an anchor carrier.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the SCS or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers—e.g., an increased SCS. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As indicated above, one or more of the base stations 105 may provide low band connections (e.g., connections via one or more low band carriers), and one or more of the base stations 105 may provide high band connections (e.g., connections via one or more high band carriers). Further, in comes cases carriers provided by different base stations 105 or at different frequencies (e.g., in different frequency bands) may not be time synchronized, and a UE 115 may measure a timing difference between two carriers and provide to one or more base stations 105 an indication of the timing difference. A base station 105 that receives the indication of the timing difference may determine, based at least in part on the timing difference, that the UE 115 is to use asynchronous CA to communicate on the carriers (e.g., to use a high band carrier as an aggregated carrier and a low band carrier as an anchor carrier) and configure the UE 115 to use asynchronous CA at least in part by configuring the UE 115 to observe a reporting delay between receiving a packet on the aggregated carrier and transmitting an acknowledgement of the packet on the anchor carrier.

Figure 2:
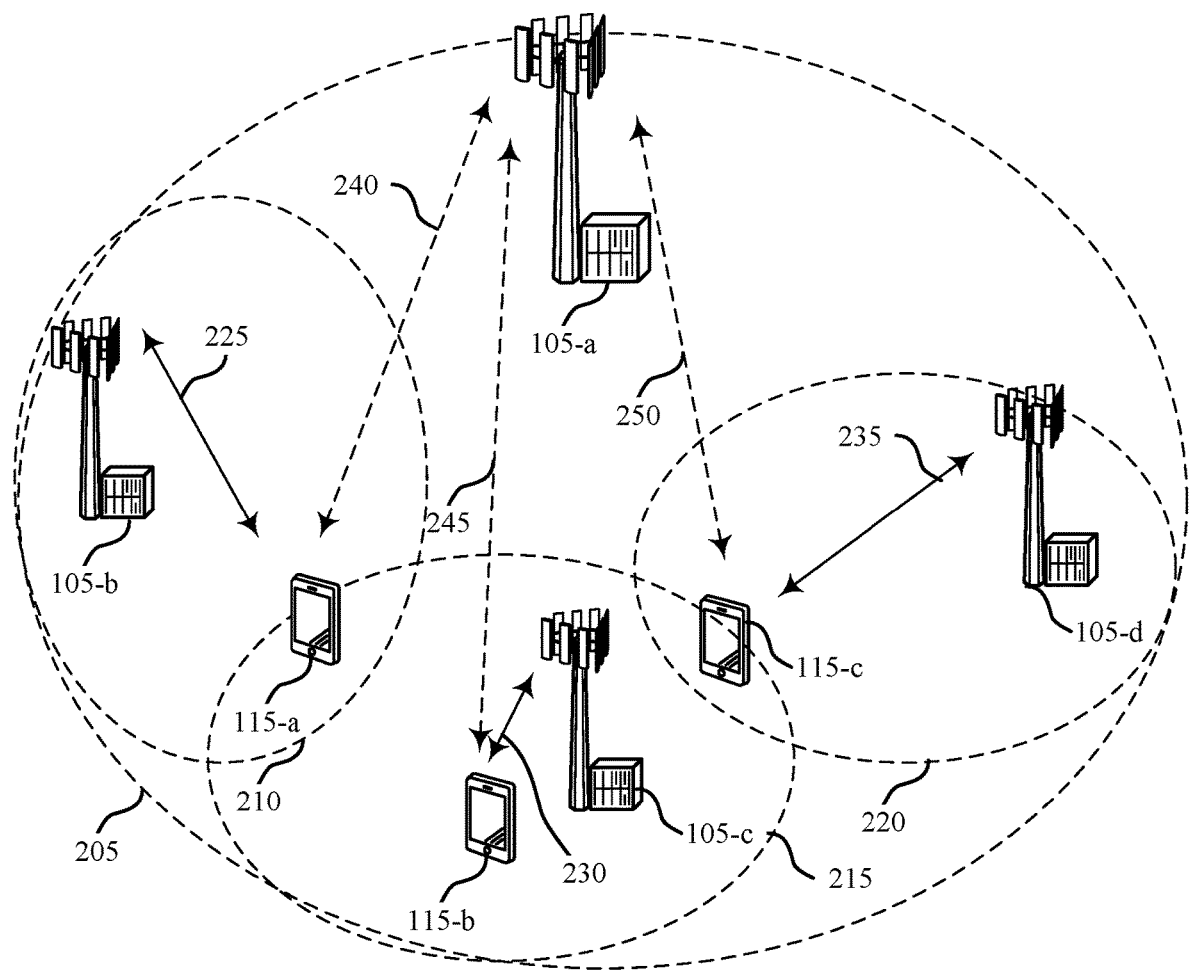
FIG. 2 illustrates an example of a wireless communications system that supports asynchronous CA in accordance with aspects of the present disclosure.

FIG. 2 illustrates an example of a wireless communications system 200 that supports asynchronous CA in accordance with various aspects of the present disclosure. In some examples, wireless communications system 200 may be implemented by aspects of wireless communications system 100. In the example of FIG. 2, the wireless communications system 200 may include a first base station 105-a, a second base station 105-b, a third base station 105-c, and a fourth base station 105-d, which may be examples of base stations 105 of FIG. 1. The wireless communications system 200 may also include a first UE 115-a, a second UE 115-b, and a third UE 115-c, which may be examples of UEs 115 of FIG. 1.

In this example, the first base station 105-a may have a relatively large first geographic coverage area 205, and may support transmissions at relatively low frequencies. For example, the first base station 105-a may support low band transmission to multiple UEs 115. The second base station 105-b may have a relatively small second geographic coverage area 210, and may support transmissions at relatively high frequencies. Likewise, the third base station 105-c may have a relatively small third geographic coverage area 215, and the fourth base station 105-d may have a relatively small fourth geographic coverage area 220, and each of the third and fourth base stations 105-c and 105-d may support transmissions at relatively high frequencies.

In this example, the first UE 115-a may have a first connection, which may be with first base station 105-a and may include low-band transmissions 240. Similarly, the second UE 115-b may have a first connection, which may be with first base station 105-a and may include low-band transmissions 245. Likewise, the third UE 115-c may have a first connection, which may be with first base station 105-a and may include low-band transmissions 250.

The first UE 115-a may be within range of and monitor high-band transmissions 225 from the second base station 105-b. Similarly, the second UE 115-b may be within range of and monitor high-band transmissions 230 from the third base station 105-c. Likewise, the third UE 115-c may be within range of high-band transmissions 235 from the fourth base station 105-d.

The high band transmissions 225, 230, 235 may use relatively high frequencies, as indicated above. In some cases, the high band transmissions 225, 230, 235 may use frequencies in the range of 4 GHz or higher. In some examples, the high band transmissions 225, 230, 235 may use mmW frequencies and may be beamformed mmW transmissions. The low band transmissions 240-250 may use relatively low frequencies, such as frequencies in the area of 600 MHz. In some cases, the low band transmissions 240, 245, 250 may support an anchor carrier connection, and the high band transmissions 225, 230, 235 may support one or more CCs or eCCs aggregated with the anchor connection. In some cases, the first base station 105-a may be operated by a mobile network operator (MNO), and the second base station 105-b, third base station 105-c, and fourth base station 105-d may be operated by a different MNO or be non-MNO base stations 105. Further, low band transmissions 240, 245, 250 may utilize licensed spectrum, and the high band transmissions 225, 230, 235 may utilize unlicensed spectrum, or vice versa.

The first base station 105-a, in this example, may provide umbrella low band connectivity for each of the high band second base station 105-b, third base station 105-c, and fourth base station 105-c. Due to attenuation and directional transmissions of transmissions of the high band second base station 105-b, third base station 105-c, and fourth base station 105-d, each of these base stations 105 may not be able to detect high band communications of other of the base stations 105, and in some cases may be non-MNO base stations 105 in an indoor deployment. Further, similarly as indicated above, the high band second base station 105-b, third base station 105-c, and fourth base station 105-d may not have a backhaul connection with sufficient reliability or adequate latency to support timing synchronization between the base stations 105 (e.g., a backhaul connection may not have a predictable enough latency to support a network time synchronization protocol such as IEEE 1588).

The high band transmissions 225, 230, 235 may not be time synchronized with one another or with low band transmissions 240, 245, 250. For example, high band transmissions 225 may not be synchronized with low band transmissions 240. The first UE 115-a may have at least a first connection established with the first base station 105-a using a first carrier including low-band transmissions 240 and may also monitor one or more of high-band transmissions 225. In some cases, the first base station 105-a may configure the first UE 115-a to monitor one or more of high-band transmissions 225. The first UE 115-a may measure a timing difference between high-band transmissions 225 and low-band transmissions 240. In such cases, the first UE 115-*a* may include a common oscillator, or other common timing reference (e.g., crystal timing reference, resonator, etc.), which the UE 115-*a* may use to measure the timing difference between high band transmissions 225 and low band transmissions 240. In some cases, the first UE 115-*a* may derive the low band and high band clock from the common timing reference, and may monitor for one or more reference signals (e.g. a discovery reference signal (DRS) or a synchronization signal such as a primary synchronization signal (PSS) or secondary synchronization signal (SSS)) from both the first base station 105-*a* and the second base station 105-*b* (and also for reference signals from any other base stations 105, such as third base station 105-*c*, that may be detected by the first UE 115-*a*). The first UE 115-*a*, in some cases, may derive the timing difference between low band transmissions 240 and the high band transmissions 225 in terms of a sampling rate associated with the high band transmissions 225. The timing difference may include a timing offset between reference subframes, slots, symbols, samples, or any combination of those or other timing or scheduling units included within a carrier utilizing low band transmissions 240 and another carrier utilizing high band transmissions 225.

The first UE 115-*a* may transmit to a base station, such as the first base station 105-*a* or the second base station 105-*b*, an indication of the measured timing difference. For example, the first UE 115-*a* may transmit the indication of the timing difference as part of a carrier report. In some cases, the report with the measurement of the timing difference may be transmitted via a MAC control element (MAC-CE) based report or an RRC measurement report.

In some cases, the first UE 115-*a* may monitor high band transmissions 225 prior to establishing a low band connection with the first base station 105-*a*. For example, the first UE 115-*a* may monitor high band transmissions on an opportunistic or periodic basis. In some cases, after the first UE 115-*a* has established a low band connection with the first base station 105-*a* using low band transmissions 240, the first base station 105-*a* may configure the first UE 115-*a* to monitor high band transmissions 225—e.g., on a periodic or otherwise scheduled basis, on an opportunistic basis, on an event-triggered basis, or on an as-instructed basis. Monitoring a high band transmission may include monitoring one or more reference signals (e.g., DRS, SSS, PSS) or other signals carried via the high band transmission.

A base station 105 that receives the indication of the timing difference—e.g., the first base station 105-*a* or the second base station 105-*b*—may determine a connectivity mode that the first UE 115-*a* is to use for communications using high band transmissions 225. For example, based at least in part on the timing difference, the base station 105 may determine whether the first UE 115-*a* is to use a dual connectivity mode (e.g., an independent radio connection with downlink and uplink data and control signaling via high band transmissions 225), a synchronous CA mode (e.g., using an anchor carrier including low band transmissions 240 and an aggregated carrier including high band transmissions 225, with uplink control signaling related to the aggregated carrier conducted via the anchor carrier in accordance with synchronous CA techniques), or an asynchronous CA mode (e.g., using an anchor carrier including low band transmissions 240 and an aggregated carrier including high band transmissions 225, with uplink control signaling related to the aggregated carrier conducted via the anchor carrier in accordance with asynchronous CA techniques as provided herein).

The base station 105 may determine that the first UE 115-*a* is to use asynchronous CA based at least in part on comparing the timing difference to a threshold timing difference. For example, the base station 105 may compare the timing difference to the threshold timing difference and, if the timing difference is greater than the threshold timing difference, may determine that the first UE 115-*a* is to use an asynchronous connectivity mode such as dual connectivity or asynchronous CA; alternatively, if the timing difference is less than the threshold timing difference, the base station 105 may determine that the first UE 115-*a* is to use synchronous CA. The base station 105 may determine the threshold timing difference at least in part based on the SCS and other timing characteristics of low band transmissions 240 and high band transmissions 225. The base station 105 may also evaluate other factors to determine the connectivity mode that the first UE 115-*a* is to use for communications using high band transmissions 225.

For example, the base station 105 may further determine that the first UE 115-*a* is to use asynchronous CA based at least in part on a frequency difference between low band transmissions 240 and high band transmissions 225. In some cases, if relatively little frequency difference exists between carriers using low band transmissions 240 and high band transmissions 225 (e.g., low band transmissions 240 and high band transmissions 225 are in fact part of a same frequency band), the base station 105 may determine that the first UE 115-*a* is to use synchronous CA. Similarly, if the frequency difference is beyond a threshold frequency difference, the base station 105 may determine that the first UE 115-*a* is to use asynchronous CA. The base station 105 may determine the frequency difference between low band transmissions 240 and high band transmissions 225 if the base station 105 is able to detect high band transmissions 225, or the first UE 115-*a* may transmit to the base station 105 an indication of the frequency difference.

As another example, the base station 105 may further determine that the first UE 115-*a* is to use asynchronous CA based at least in part on whether the first UE 115-*a* is able to establish an uplink connection on a carrier using high band transmissions 225. In some cases, the base station 105 may determine that the first UE 115-*a* is to use CA, such as asynchronous CA or synchronous CA, if the first UE 115-*a* is unable to establish an uplink connection on a carrier using high band transmissions 225.

In some cases, the first UE-115-*a* may determine a channel quality metric—e.g., a received signal strength indicator (RSSI), a reference signal received power (RSRP), a reference signal received quality (RSRQ), CSI, a channel quality indicator (CQI), a precoding matrix indicator (PMI), a precoding type indicator (PTI), a rank indication (RI) (which may also be known as a rank-1 CQI), a signal to noise ratio (SNR), a signal to interference plus noise ratio (SINR), or any combination thereof—and transmit an indication of the channel quality metric to the base station 105. The base station 105 may compare the measured channel quality metric to a threshold value of the channel quality metric and determine, based at least in part on the comparison, whether the first UE 115-*a* may establish an uplink connection on a carrier using high band transmissions 225. In some examples, the threshold value of the channel quality metric may depend at least in part on the power class of the first UE 115-*a*.

The first UE 115-*a* may also transmit to the base station 105 an indication of whether the first UE 115-*a* is able to establish an uplink connection on a carrier using high band transmissions 225. For example, the first UE 115-*a* may transmit to the base station 105 an indication that the first UE 115-a is unable to establish an uplink connection on a carrier using high band transmissions 225 due to maximum permissible exposure (MPE) constraints that may be exceeded by an uplink connection using high band transmissions 225 or due to a battery charge level for the first UE 115-a that may be insufficient to support an uplink connection using high band transmissions 225. As another example, the first UE 115-a may attempt to establish an uplink connection with the second base station 105-b using high band transmissions 225 via one or more random access procedures and, if the one or more random access procedures are unsuccessful, the first UE 115-a may transmit to the base station 105 an indication that the first UE 115-a is unable to establish an uplink connection on a carrier using high band transmissions 225. For the one or more random access procedures, the first UE 115-a may utilize a full transmit power or a transmit power specified by the base station 105. In some cases, the first UE 115-a may attempt to establish an uplink connection with the second base station 105-b using high band transmissions 225 via one or more random access procedures in deployments in which reciprocity between downlink and uplink transmissions using high band transmissions 225 may not be assumed—e.g., deployments utilizing different transmit and receive arrays or FDD.

As another example, the base station 105 may also determine that the first UE 115-a is to use asynchronous CA based at least in part on whether aggregation between carriers supported by the first base station 105-a and the second base station 105-b may be aggregated. For example, the base station 105 may evaluate whether a backhaul connection between the first base station 105-a and the second base station 105-b is of sufficient quality (e.g., exhibits tolerable latency) or reliability to support CA. As another example, the base station 105 may determine whether the first base station 105-a and the second base station 105-b are operated by a same MNO or by different MNOs having an agreement allowing aggregation. In some cases, the base station 105 may determine that the first UE 115-a is to use CA, such as asynchronous CA or synchronous CA, if carriers supported by the first base station 105-a and the second base station 105-b may be aggregated.

If the base station 105 determines that the first UE 115-a is to use an asynchronous CA mode, the base station 105 may configure the first UE 115-a to observe at least a minimum amount of delay between receiving downlink transmissions via a high band transmission 225 sending a related uplink transmission via a low band transmission 240. For example, the base station 105 may configure the first UE 115-a to observe at least a minimum amount of reporting delay between receiving a packet via a high band transmission 225 and transmitting an acknowledgement of the packet via a low band transmission 240. The acknowledgement may be an indication of a successful decode of the packet (referred to herein as ACK) or may be an indication of an unsuccessful decode of the packet (referred to herein as a NACK). As another example, the base station 105 may configure the first UE 115-a to observe at least a minimum amount of reporting delay between receiving a packet via a high band transmission 225 and transmitting a channel quality metric such as CSI or other related information, such as beam management information, rate control information, cross-carrier control information, power control information, radio resource management information, buffer status information, or the like corresponding to the packet via a low band transmission 240. More details regarding the timing of uplink transmissions by a UE 115 operating in an asynchronous CA mode of communication are explained below. Further, where described in terms of the first UE 115-a, the first base station 105-a, and the second base station 105-b, it is to be understood that like techniques may be utilized by other UEs 115 and base stations 105.

Figure 3:
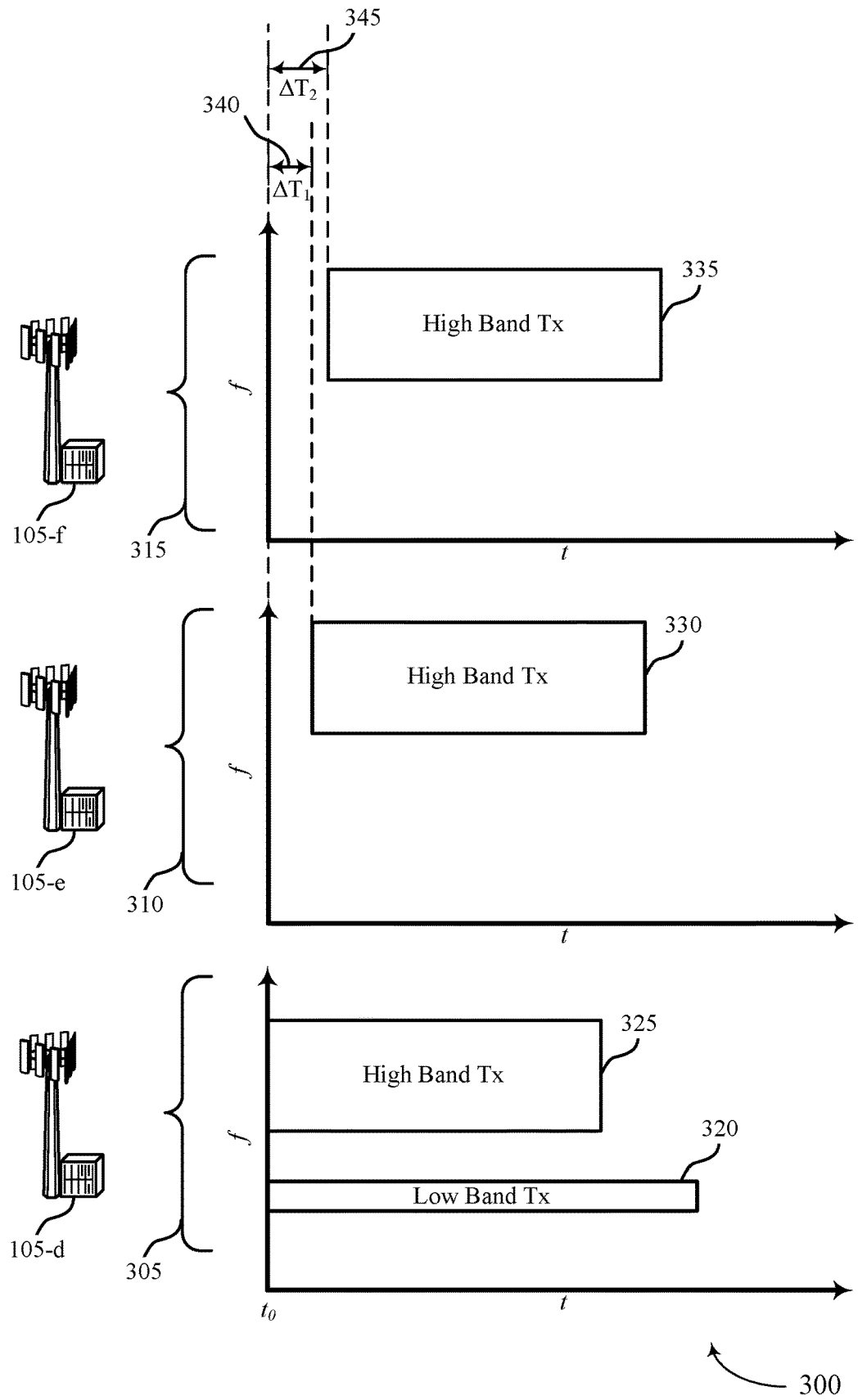
FIG. 3 illustrates an example of frequency band timing that supports asynchronous CA in accordance with aspects of the present disclosure.

FIG. 3 illustrates an example of a timing difference measurement 300 that supports asynchronous CA in accordance with various aspects of the present disclosure. In some examples, timing difference measurement 300 may be used in aspects of wireless communications system 100 or 200 to determine whether a UE 115 is to use asynchronous CA and, if so, to determine a minimum amount of delay for the UE 115 to use in uplink signaling via an anchor carrier.

In this example, a first base station 105-d may transmit using frequency bands 305, a second base station 105-e may transmit using frequency bands 310, and a third base station 105-f may transmit using frequency bands 315. In this example, the first base station 105-d may transmit both low band transmissions 320 and high band transmissions 325 that may be received at a UE 115 (e.g., a UE 115 of FIG. 1 or 2). The second base station 105-e may transmit high band transmissions 330 that may be received at the UE 115, and the third base station 105-f may transmit high band transmissions 335 that may be received at the UE 115.

In this example, the first base station 105-d may initiate transmissions starting at $t_0$, which may be a starting time of a subframe, a slot, a symbol, a sample of a symbol or some other timing or scheduling unit. The UE 115 may have a connection established with the first base station 105-d for the low band transmission 320, and may also be within a coverage area of the second base station 105-e and the third base station 105-f such that the UE 115 can detect and monitor the high band transmissions 330 and 335. In some cases, the UE 115 may measure time differences between transmissions associated with different base stations 105 from which the UE 115 can detect transmissions (e.g., base stations 105 for which the UE 115 can detect a DRS, PSS, SSS, or other reference or synchronization signal).

In this example, high band transmissions 330 and 335 of the second base station 105-e and the third base station 105-f may be out of time synchronization with the first base station 105-d (e.g., due to oscillator drift, due to only being roughly synchronized using low band timing, or due to some other cause) such that the high band transmissions 330 of the second base station 105-e start at a first time difference ($\Delta T_1$ 340) relative to the transmissions 320, 325 of the first base station 105-d and the high band transmissions 335 of the third base station 105-f start at a second time difference ($\Delta T_2$ 345) relative to the transmissions 320, 325 of the first base station 105-d.

A UE 115 that is able to detect the high band transmissions 330 of the second base station 105-e and the high band transmissions 335 of the third base station 105-f may measure the respective timing differences 340, 345. In some cases, the UE 115 may use a common timing reference, such as a common oscillator, to derive the timing differences. Such a UE 115 may measure the first timing difference 340, the second timing difference 345, or both and may transmit to one or more of the base stations 105 an indication of the time difference. The UE 115 may measure a timing difference in terms of a sampling rate for one of the transmission bands, such as high band transmissions 330 or high band transmissions 335. Further, either the UE 115 or a base station 105 may translate a timing difference measured in terms of a sampling rate to a timing difference expressed in units of time (e.g., milliseconds or microseconds).

A base station 105 may receive an indication of a timing difference and determine, based at least in part on the timing difference, whether the UE 115 is to use asynchronous CA as described herein. For example, the first base station 105-d may receive timing difference 340 and determine whether the UE 115 is to use asynchronous CA for communications using high band transmissions 330, or may receive timing difference 345 and determine whether the UE 115 is to use asynchronous CA for communications using high band transmissions 335.

Figure 4:
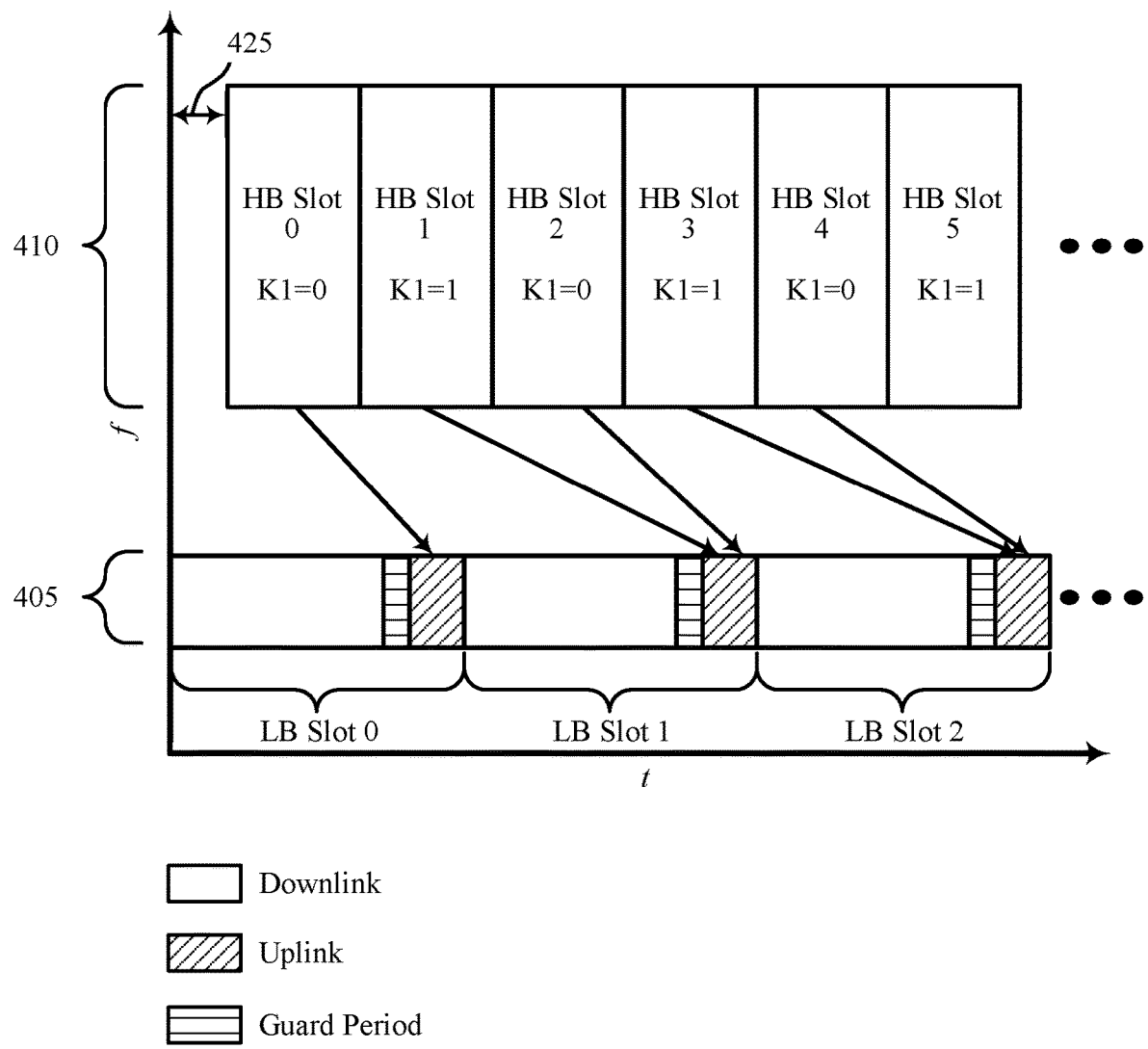
FIG. 4 illustrates an example of a reporting delay that supports asynchronous CA in accordance with aspects of the present disclosure.

FIG. 4 illustrates an example of a minimum reporting delay 400 that supports asynchronous CA in accordance with various aspects of the present disclosure. In some examples, minimum reporting delay 400 may be implemented aspects of wireless communications system 100 or 200.

In the example of minimum reporting delay 400, a UE 115 may establish a connection with a base station 105 using a first carrier supported by the base station 105. The first carrier may be a relatively low band carrier and may include low band slots (LB slots) 405.

The UE also may detect and monitor a relatively high band carrier supported by another base station 105. The relatively high band carrier may include high band (HB) slots 410. The carrier for the HB slots 410 may have different SCS and different slot duration than the carrier for the LB slots 405. For example, the carrier for the LB slots 405 may have a lower SCS than the carrier for the HB slots 410, and LB slots 405 may have a longer temporal duration than HB slots 410. In some cases, the low band carrier may have an SCS of 30 kHz while the high band carrier may have an SCS of 60 kHZ.

As described herein, in some cases the UE 115 may use a common oscillator (or other common timing reference) to derive a timing difference 425 between the low frequency slots 405 and the high frequency slots 410. Though illustrated in minimum reporting delay 400 as a timing offset between slots, it is to be understood that the timing difference may be a timing offset between other timing or scheduling units of two carriers. A UE 115 or a base station 105 may in some cases convert a timing difference for two carriers measured or indicated in terms of other timing or scheduling units into a timing offset between slots based on information about the two carriers (e.g., frequency, SCS, number of symbols per slot or subframe, number of samples per symbol, etc.).

The UE 115 may transmit an indication of the timing difference to a serving base station 105 (e.g., the base station 105 supporting LB slots 405 or the base station 105 supporting HB slots 410). The UE 115 may also transmit to the serving base station 105 an indication of other characteristics of the carriers for LB slots 405 and HB slots 410. For example, the UE 115 may determine and transmit to the serving base station 105 an indication of frequency and SCS for a carrier, an indication of channel quality for a carrier, a slot duration for a carrier, a duration of an uplink or downlink portion of a slot for a carrier, or a duration of a guard period for a carrier. The UE 115 may also determine and transmit to the serving base station 105 an indication of an uplink timing advance for a carrier, which may represent a length of time required for an uplink transmission from the UE 115 using the carrier to reach the base station 105 that supports the carrier. The UE 115 may also determine and transmit to the serving base station 105 an indication of a processing time for a packet (e.g., an amount of time required by the UE 115 to decode the packet) received via a carrier. In some cases, the UE 115 may measure at least one of an uplink timing advance for the first carrier, a processing time for the packet, or a second slot duration for the second carrier, and transmit an indication of at least one of the uplink timing advance, the processing time, or the second slot duration for the second carrier, to the base station. The serving base station 105 may use such information from the UE 115 and other criteria described herein to determine whether the UE 115 is to use asynchronous CA for two or more carriers and, if so, to configure the UE 115 to observe at least minimum delays in conducting uplink signaling via an anchor carrier.

For example, in the example of minimum reporting delay 400, the serving base station 105 may configure the UE 115 to use LB slots 405 as an anchor carrier in an asynchronous CA mode of operation. The serving base station 105 may further configure the UE 115 to observe at least a minimum amount of delay between receiving data in an HB slot 410 and conducting related uplink signaling (e.g., uplink control signaling) in an LB slot 405. If an HB slot 410 does not precede the uplink portion of a contemporaneous LB slot 405 by at least the minimum amount of delay, the UE 115 may wait until the uplink portion of a subsequent LB slot 405 to conduct uplink signaling related to data received in the HB slot 410.

In some cases, a serving base station 105 may configure the UE 115 to observe the minimum delay by configuring a reporting parameter associated with an HB slot 410, which may be referred to herein as K1. For example, in the example of minimum reporting delay 400, K1 is zero for HB Slot 0, HB Slot 2, and HB Slot 4, and as illustrated by the arrows, the UE 115 conducts associated uplink signaling in the immediately subsequent uplink portion of an LB slot 405. K1 is one, however, for HB Slot 1 and HB Slot 3, and the UE 115 observes a delay period before conducting associated uplink signaling in the uplink portion of an LB slot 405 immediately subsequent to the delay period.

In some cases, the serving base station 105 may determine the delay period according to the following delay equation, in which the following variables represent the following physical quantities:

T_async represents the timing difference, as measured in terms of a temporal offset between a reference LB slot 405 and a reference HB slot 410;

T_slot_CC1 represents the duration of an LB slot 405;

T_slot_CC2 represents the duration of an HB slot 410;

T_UL_CC1 represents the duration of an uplink portion of an LB slot 405;

T_UL_TA_CC1 represents an uplink timing advance for the carrier of LB slots 405; and T_proc_CC2 represents a processing time for a UE 115 to decode a packet received by the UE 115 on the carrier of HB slots 410.

$$\text{delay} = \frac{\text{T\_async} + \text{T\_slot\_CC2} + \text{T\_proc\_CC2} + \text{T\_UL\_TA\_CC1} + \text{T\_UL\_CC1}}{\text{T\_slot\_CC1}}$$

The serving base station 105 may further use a floor function to configure K1. For example, the serving base station 105 may configure K1 as equal to floor (delay), and may configure the UE 115 to observe the number of delay periods indicated by the value of K1 (e.g., zero delay periods if K1=0, one delay period if K1=1, two delay periods if K1=2, and so on) between receiving data via an HB slot 410 and conducting related uplink signaling via an LB slot 405.

Thus, UE 115 may observe the minimum delay (e.g., the number of delay periods indicated by K1) and then conduct uplink signaling in the immediately subsequent uplink portion of an LB slot 405.

In some cases, if the minimum delay is large (e.g., due to a large timing difference or a large packet processing time), the serving base station 105 may configure the UE 115 to observe the minimum delay at least in part via an RRC protocol—for example, the serving base station 105 may configure some amount of delay for a carrier via an RRC protocol, and may then configure only additional amounts of delay via K1 values, and the UE 115 may determine the minimum delay to observe by combining the RRC-configured delay with the K1-signaled delay, thus reducing a number of bits required for K1-related signaling.

In some cases, the serving base station 105 may configure the UE 115 to observe at least a minimum delay between receiving a packet in an HB slot 410 and reporting an acknowledgement (e.g., ACK or NACK) in an LB slot 405. The serving bases station 105 may configure the UE 115 to report the acknowledgement as part of a physical uplink shared channel (PUSCH) or a physical uplink control channel (PUCCH) within an LB slot 405.

The serving base station 105 may similarly configure the UE 115 to observe at least a minimum delay between receiving a packet in an HB slot 410 and reporting related information in an LB slot 405 such as one or more channel quality metrics (e.g., CSI or other related information), beam management information, rate control information, cross-carrier control information, power control information, radio resource management information, buffer status information, or the like. The serving base station 105 may configure different minimum delays (e.g., different K1 values) for different parameters to be reported by the UE 115. For example, the serving base station 105 may in some cases substitute for Tproc_CC2 in the delay equation above an amount of time required to determine a particular type of information to be reported by the UE 115, such as an amount of time required to determine CSI. Similarly, the serving base station 105 may in some cases substitute for T_slot_CC2 in the delay equation above a duration specific to the particular type of information to be reported by the UE 115, such as the duration of a portion of an HB slot 410 including a CSI reference signal (CSI-RS) or CSI interference measurement (CSI-IM).

In some examples, HB slots 410 may include both uplink and downlink portions, and a serving base station 105 may substitute for T_slot_CC2 in the above delay equation a duration corresponding to only the downlink portion of an HB slot 410. Also, in some examples, T_UL_CC1 may vary among LB slots 405 depending upon how much uplink data is scheduled for a given LB slot 405. For example, if an ACK/NACK is the only uplink data scheduled for an LB slot 405, T_UL_CC1 may be the duration of a single symbol.

Figure 5:
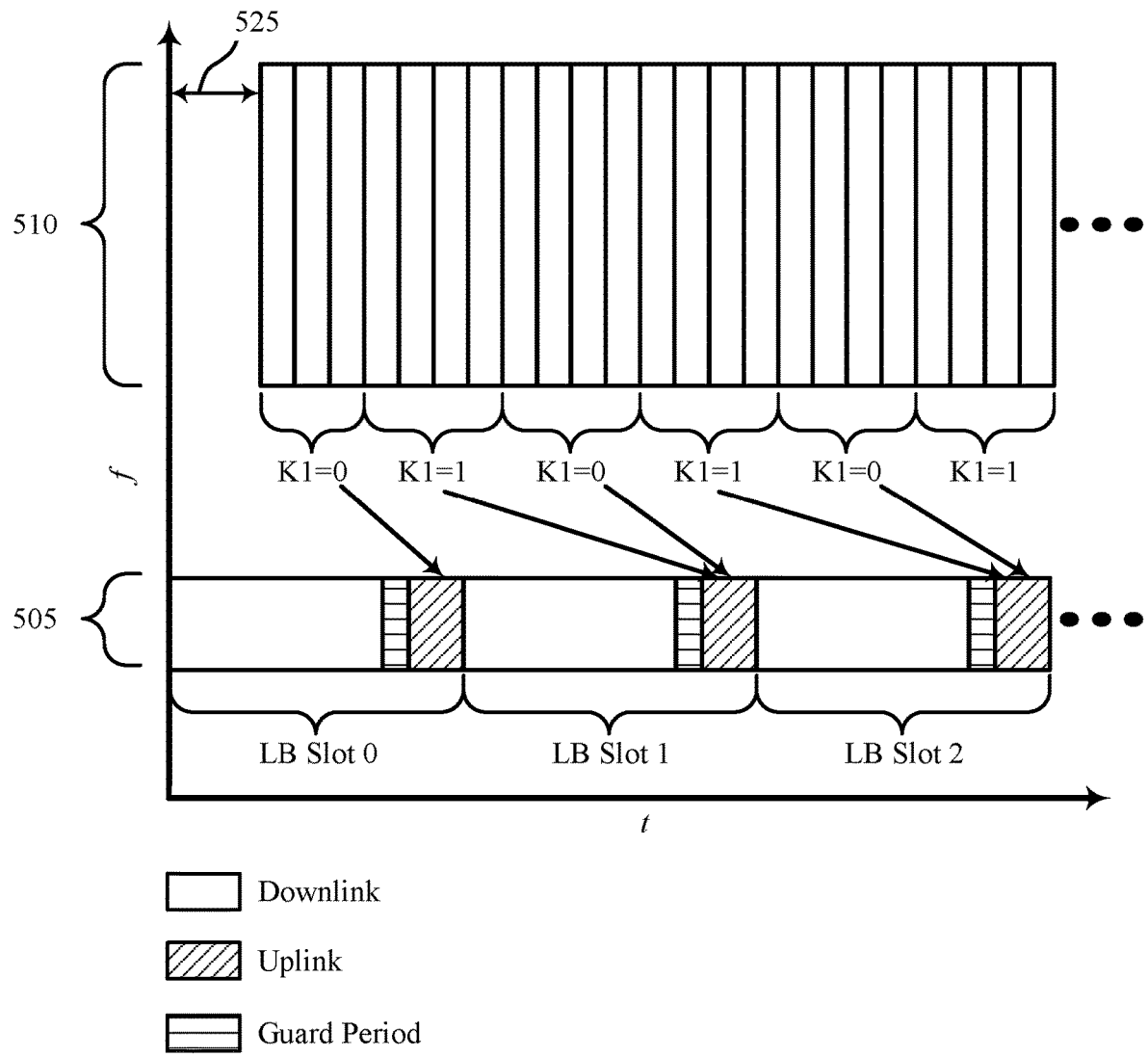
FIG. 5 illustrates an example of a reporting delay that supports asynchronous CA in accordance with aspects of the present disclosure.

FIG. 5 illustrates an example of a minimum reporting delay 500 that supports asynchronous CA in accordance with various aspects of the present disclosure. In some examples, minimum reporting delay 500 may be implemented by aspects of wireless communications system 100 or 200.

In the example of minimum reporting delay 500, a UE 115 may establish a connection with a base station 105 using a first carrier supported by the base station 105. The first carrier may be a relatively low band carrier and may include LB slots 505. The UE 115 also may detect and monitor a relatively high band carrier supported by another base station 105. The relatively high band carrier may include HB slots 510. In some cases, the low band carrier may have an SCS of 30 kHz while the high band carrier may have an SCS of 480 kHZ. HB slots 510 may be offset relative to LB slots 505 by a timing difference 525.

A serving base station 105 (e.g., the base station 105 supporting LB slots 505 or the base station 105 supporting HB slots 510) may configure the UE 115 to observe at least a minimum amount of delay between receiving data in an HB slot 510 and conducting related uplink signaling (e.g., uplink control signaling) in an LB slot 505 using the techniques described above in reference to minimum reporting delay 400. In minimum reporting delay 500, however, the SCS differential between HB slots 510 and LB slots 505 is much larger than the SCS difference between HB slots 410 and LB slots 405 is minimum reporting delay 400. In minimum reporting delay 500, the serving base station 105 may configure a plurality of consecutive HB slots 510 to have a same K1 value, and uplink signaling associated with the plurality of consecutive HB slots 510 having the same K1 value may occur in a same subsequent portion of an LB slot 505.

Figure 6:
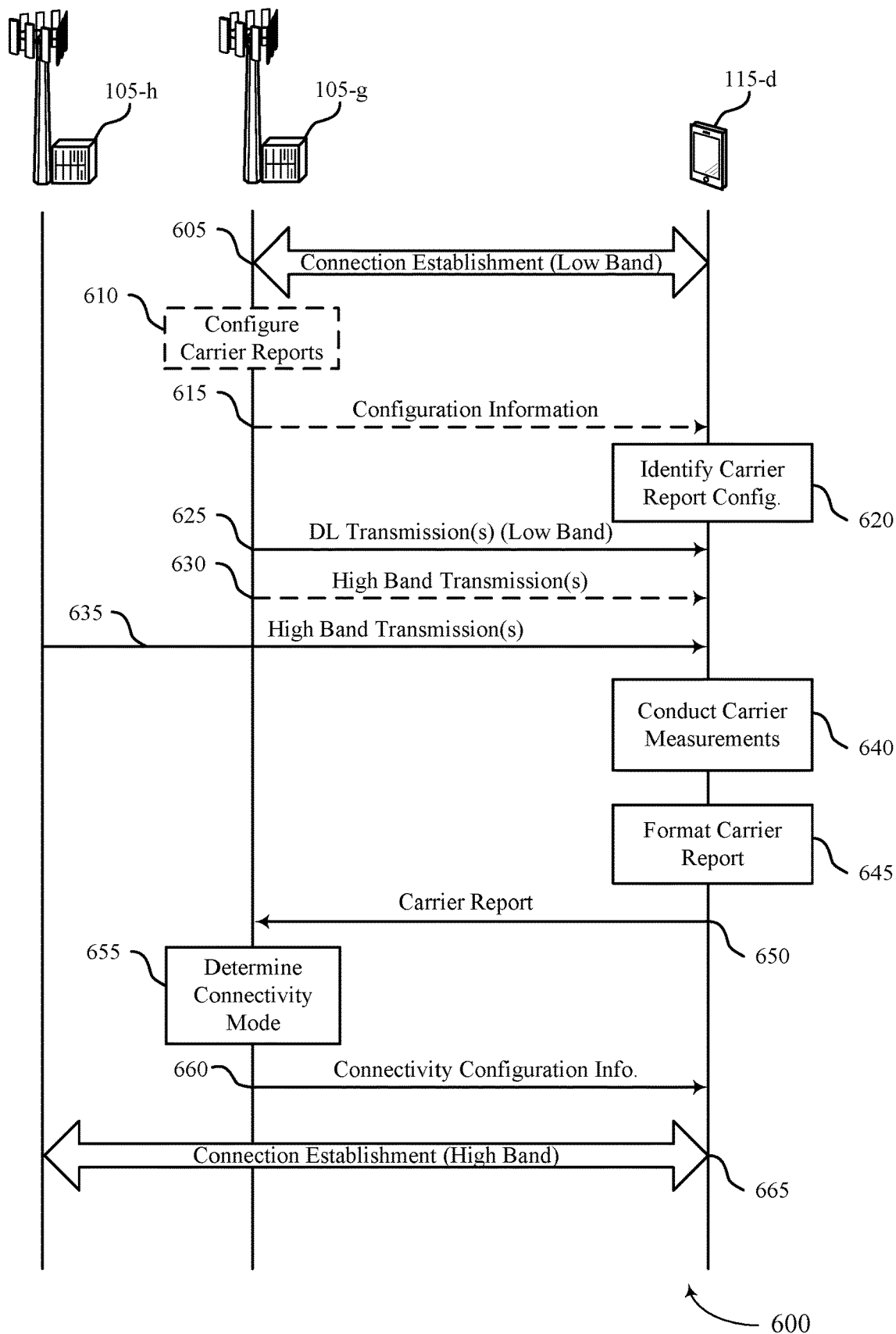
FIG. 6 illustrates an example of a process flow that supports asynchronous CA in accordance with aspects of the present disclosure.

FIG. 6 illustrates an example of a process flow 600 that supports asynchronous CA in accordance with various aspects of the present disclosure. In some examples, process flow 600 may be implemented by aspects of wireless communications system 100 or 200.

Process flow 600 may include the transmission of high band and low band transmissions between a first base station 105-*g* and a second base station 105-*h*, which may each be an example of a base station 105 of FIG. 1, 2, or 3, and a UE 115-*d*, which may be an example of a UE 115 of FIG. 1 or 2. Initially, the first base station 105-*g* and the UE 115-*d* may establish a low band connection 605. Such a connection may be established using conventional connection establishment techniques. In some cases, the low band connection 605 may be a low band anchor carrier connection.

At 610, the first base station 105-*g* may configure carrier reports for one or more UEs such that the first base station 105-*g* may receive reports including indications of carrier characteristics (e.g., measured timing differences between transmissions supported by the first base station 105-*g* and transmissions of other base stations 105, such as the second base station 105-*h*) and other carrier-related information (e.g., information about the ability of a UE to establish an uplink connection on a carrier). The first base station 105-*g* may transmit configuration information 615 related to carrier reports to the UE 115-*d*. In some cases, the configuration information 615 may be transmitted in control signaling, such as RRC signaling (e.g., a downlink control information).

At 620, the UE 115-*d* may identify a carrier report configuration for reporting carrier-related information to the first base station 105-*g*. In some cases, the UE 115-*d* may identify the carrier report configuration based on the configuration information 615 received from the first base station 105-*g*. In some cases, the UE 115-*d* may be configured to detect and measure timing differences between transmissions of two or more base stations 105, and report the measured timing differences to a serving base station 105.

The first base station 105-*g* may transmit downlink low band transmissions 625 to the UE 115-*d* using the established low band connection. The downlink low band transmissions 625 may have a timing that is established during the connection establishment of the low band connection.

The first base station 105-*g* may also optionally establish a high band connection with the UE 115-*d* and transmit high band transmissions 630.

In accordance with the identified carrier report configuration, the UE 115-*d* may monitor for one or more high band transmissions (e.g., reference signals transmitted using a high band carrier) of one or more other base stations 105. In the example of FIG. 4, the UE 115-*d* may be in a location such that the UE 115-*d* may detect high band transmissions 635 by the second base station 105-*h*. In some cases, the UE 115-*d* may also detect other high band transmissions from other base stations 105. Furthermore, in some cases, the first base station 105-*g* may configure one or more UEs 115 other than UE 115-*d* to provide carrier reports.

At 640, the UE 115-*d* may conduct carrier measurements on carriers associated with low band connection 605 and high band transmissions 635 (and possibly also on high band transmissions 630 or other transmissions detectable by the UE 115-*d*). For example, the UE 115-*d* may measure a timing difference between a timing of the high band transmissions 635 of the second base station 105-*h* and a timing of the low band transmissions 625. As indicated above, in some cases the UE 115-*d* may measure a timing difference between starting times of reference subframes, slots, symbols, samples, or other timing elements in the low band transmissions 625 and the high band transmissions 635. UE 115-*d* may determine the timing difference using a common timing reference.

The UE 115-*d* may additionally measure other information described herein as relevant to a determination of whether the UE 115-*d* is to use asynchronous CA and an amount of delay to observe when conducting uplink signaling in an asynchronous CA mode of operation. For example, at 640 the UE 115-*d* may additionally measure a timing advance for uplink transmissions to the first base station 105-*g* using the low band connection 605, one or more channel quality metrics, radio frequency exposure levels, battery charge levels, determine whether the UE 115-*d* may establish a UL connection using high band transmissions 635, and measure a frequency difference between low band transmissions associated with low band connection 605 and high band transmissions 635.

At 645, the UE 115-*d* may format a carrier report. The carrier report may include any information measured or otherwise determined at 640, such as an indication of the measured timing difference between the high band transmissions 635 and the low band transmissions 625. In some cases, the UE 115-*d* may provide the indication of the timing difference as a time difference (e.g., as a number of nanoseconds, microseconds, etc.). In other cases, the UE 115-*d* may provide an indication of the timing difference as a number of sampling periods (e.g., high band sampling periods or basic time unit sampling period $T_s$ as discussed above). In cases where the UE 115-*d* detects two or more high band transmissions from two or more base stations 105, each measured timing difference may be included in the carrier report. The carrier report may also include an identification of the second base station 105-*h* (and any other measured base stations 105), which may be, for example a cell identification (cell ID) associated with the second base station 105-*h*.

The UE 115-*d* may transmit the carrier report 650 to the first base station 105-*g*. In some cases, the timing report may be transmitted using the low band connection. In some cases, the timing report may be transmitted using a MAC-CE or RRC measurement report.

At 655, the first base station 105-*g* may receive the carrier report 650 and determine a connectivity mode that the UE 115-*d* may use for communications with the second base station 105-*h*, such as high band communications with the second base station 105-*h*. For example, as described herein, the first base station 105-*g* may determine whether UE 115-*d* is to use a dual connectivity mode, a synchronous CA mode, or an asynchronous CA mode for communications with the second base station 105-*h*. In some cases, the first base station 105-*g* may determine that the UE 115-*d* is to use asynchronous CA for communications with the second base station 105-*h*.

The first base station 105-*g* may transmit to the UE 115-*d* connectivity configuration information 660. Connectivity configuration information 660 may include an indication of a connectivity mode that the UE 115-*d* may use for communications with the second base station 105-*h* (e.g., an indication that the UE 115-*d* is to use asynchronous CA for communications with the second base station 105-*h*). In cases in which the UE 115-*d* is to use asynchronous CA, connectivity configuration information 660 may also include an indication of a minimum delay that the UE 115-*d* is to observe between receiving a high band transmission from the second base station 105-*h* and send a related uplink transmission to the first base station 105-*g*. For example, connectivity configuration information 660 may include an indication of a minimum delay that the UE 115-*d* is to observe between receiving a packet from the second base station 105-*h* (e.g., via a high band carrier supported by the second base station 105-*h*) and transmitting an acknowledgement of the packet (e.g., an ACK or a NACK) to the first base station 105-*g* (e.g., via a low band carrier supported by the first base station 105-*g*, such low band carrier corresponding to low band connection 605). In some cases, the connectivity configuration information 660 may be transmitted at least in part via control signaling, such as RRC signaling.

The UE 115-*d* may establish a high band connection 665 with the second base station 105-*h* using a high band carrier in accordance with the connectivity configuration information 660. Thereafter, UE 115-*d* may continue to monitor carrier related information (e.g., the timing difference between high band connection 665 and low band connection 605) and transmit additional carrier reports or otherwise indicate updated carrier-related information to either the first base station 105-*g* or the second base station 105-*h*, and either the first base station 105-*g* or the second base station 105-*h* may determine and transmit to the UE 115-*d* updated minimum reporting delays or configuration information for a new connectivity mode.

Figure 7:
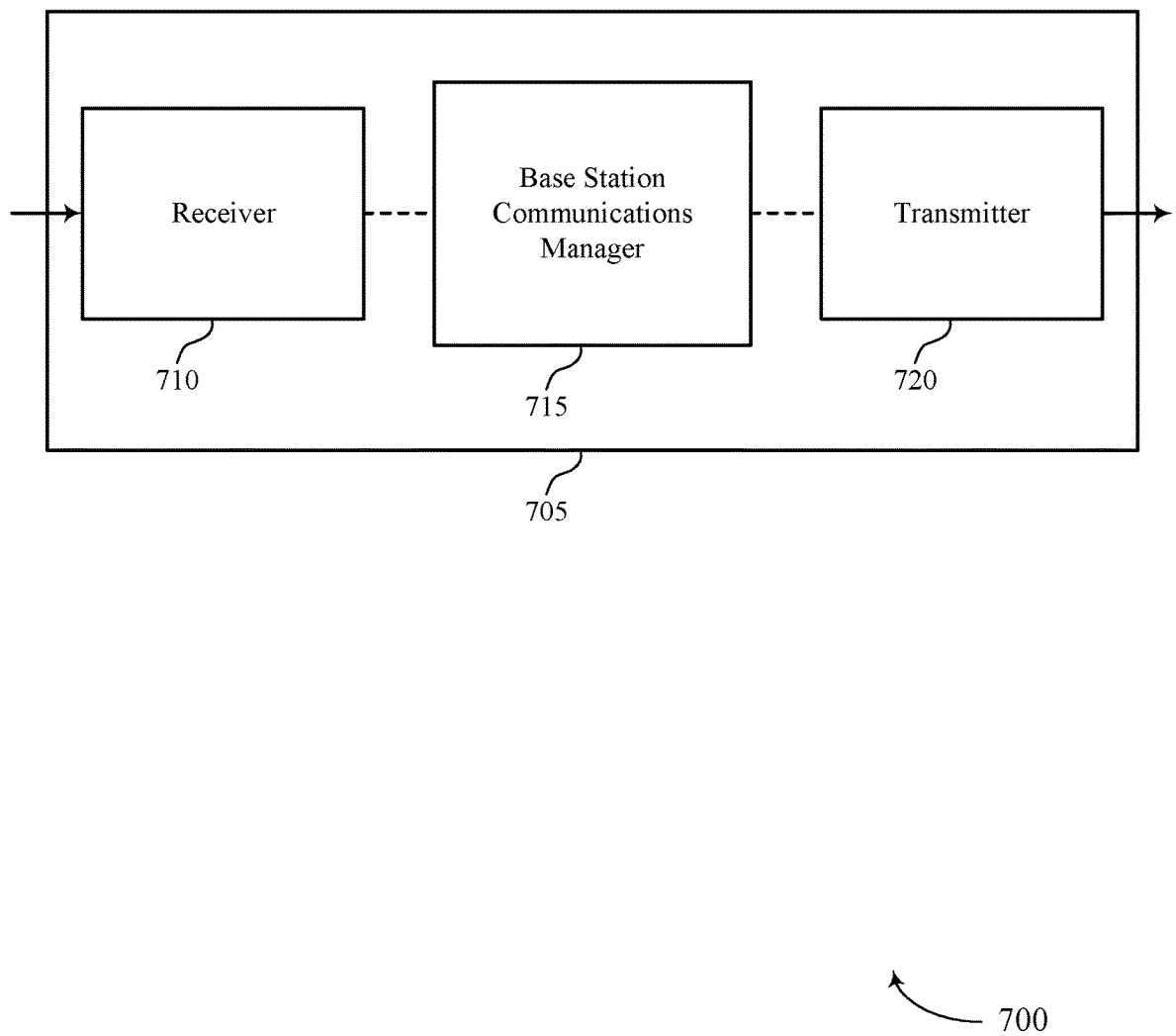
FIGS. 7 through 9 show block diagrams of a device that supports asynchronous CA in accordance with aspects of the present disclosure.

FIG. 7 shows a block diagram 700 of a wireless device 705 that supports asynchronous CA in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to asynchronous CA, etc.). Information may be passed on to other components of the device 705. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may establish a first connection with a user equipment (UE) using a first carrier in a first frequency band, receive, from the UE, a timing difference between transmissions in the first frequency band and one or more transmissions in a second frequency band that is higher than the first frequency band, and determine that the UE 115 is to use an asynchronous CA mode for communications using a second carrier in the second frequency band based on the timing difference.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
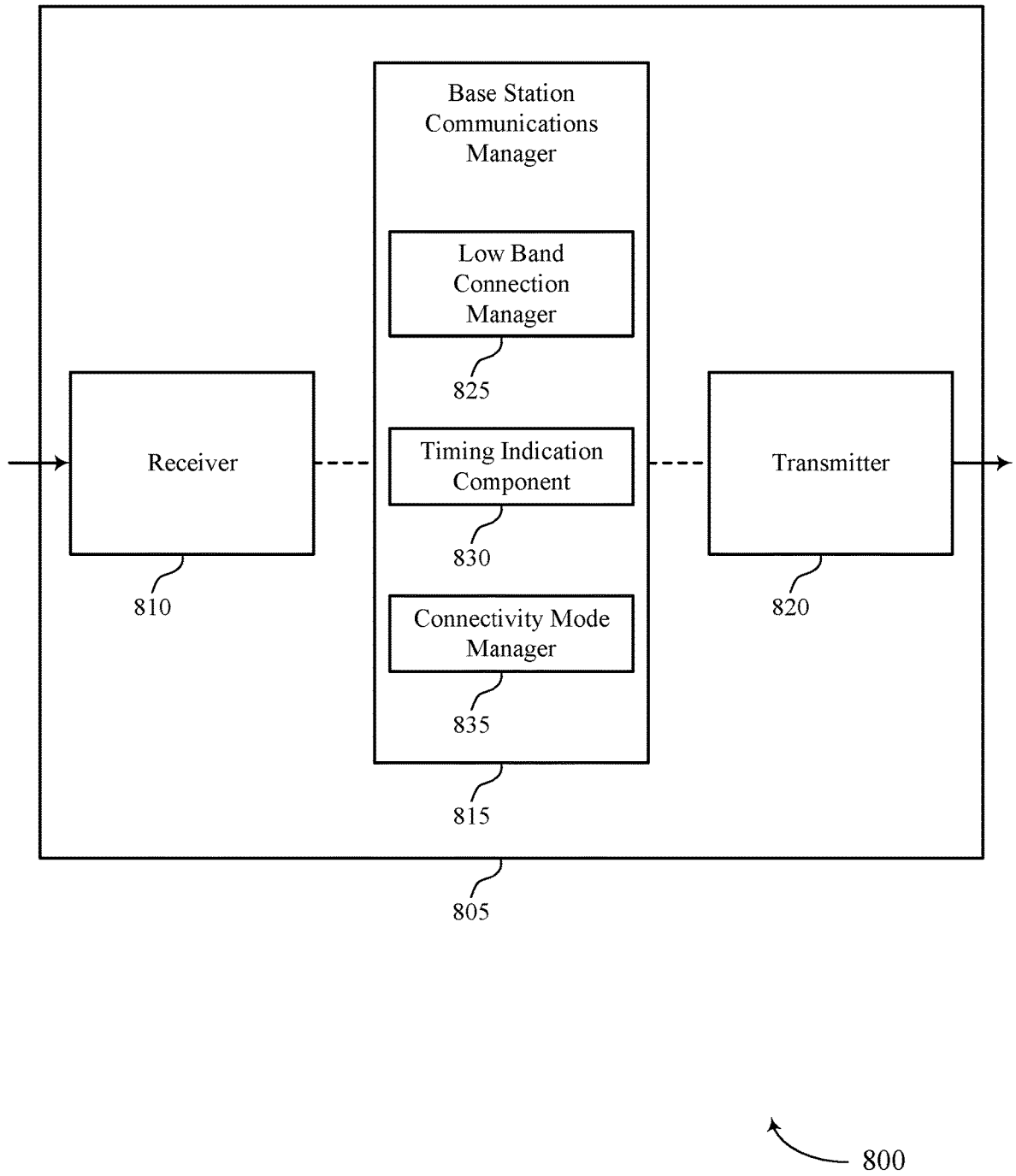

FIG. 8 shows a block diagram 800 of a wireless device 805 that supports asynchronous CA in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to asynchronous CA, etc.). Information may be passed on to other components of the device 805. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10.

Base station communications manager 815 may also include low band connection manager 825, timing indication component 830, and connectivity mode manager 835.

Low band connection manager 825 may establish a first connection with a UE 115 using a first carrier in a first frequency band.

Timing indication component 830 may receive, from the UE 115, a timing difference between transmissions in the first frequency band and one or more transmissions in a second frequency band that is higher than the first frequency band. In some cases, timing indication component 830 may also receive, from the UE 115, one or more updated timing differences. In some cases, a timing difference includes a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof.

Connectivity mode manager 835 may determine that the UE 115 is to use an asynchronous CA mode for communications using a second carrier in the second frequency band based on the timing difference. In some cases, determining that the UE 115 is to use the asynchronous CA mode for communications using the second carrier in the second frequency band based on the timing difference includes comparing the timing difference to a threshold timing difference. In some cases, connectivity mode manager 835 may determine the threshold timing difference based on a sub-carrier spacing associated with either the first frequency band or the second frequency band.

Connectivity mode manager 835 may further determine that the UE 115 is to use the asynchronous CA mode for communications using the second carrier in the second frequency band is further based on a frequency difference between the first frequency band and the second frequency band.

Connectivity mode manager 835 may further determine that the UE 115 is to use the asynchronous CA mode for communications using the second carrier in the second frequency band is further based on whether the UE 115 is able to establish an uplink connection on the second carrier. Connectivity mode manager 835 may compare a channel quality metric for the second carrier to a threshold value in order to determine whether the UE 115 is able to establish the uplink connection on the second carrier. Connectivity mode manager 835 may receive from the UE 115 an indication of whether the UE 115 is able to establish the uplink connection on the second carrier. In some cases, connectivity mode manager 835 may configure the UE 115 to attempt a random access procedure via the second carrier using a specified transmit power in order to determine whether the UE 115 is able to establish the uplink connection on the second carrier.

Connectivity mode manager 835 may further determine that the UE 115 is to use the asynchronous CA mode for communications using the second carrier in the second frequency band based on determining whether the second carrier may be aggregated with the first carrier. In some cases, determining whether the second carrier may be aggregated with the first carrier includes determining a quality of a backhaul connection between a first base station 105 corresponding to the first carrier and a second base station 105 corresponding to the second carrier.

Transmitter 820 may transmit signals generated by other components of the device 805. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
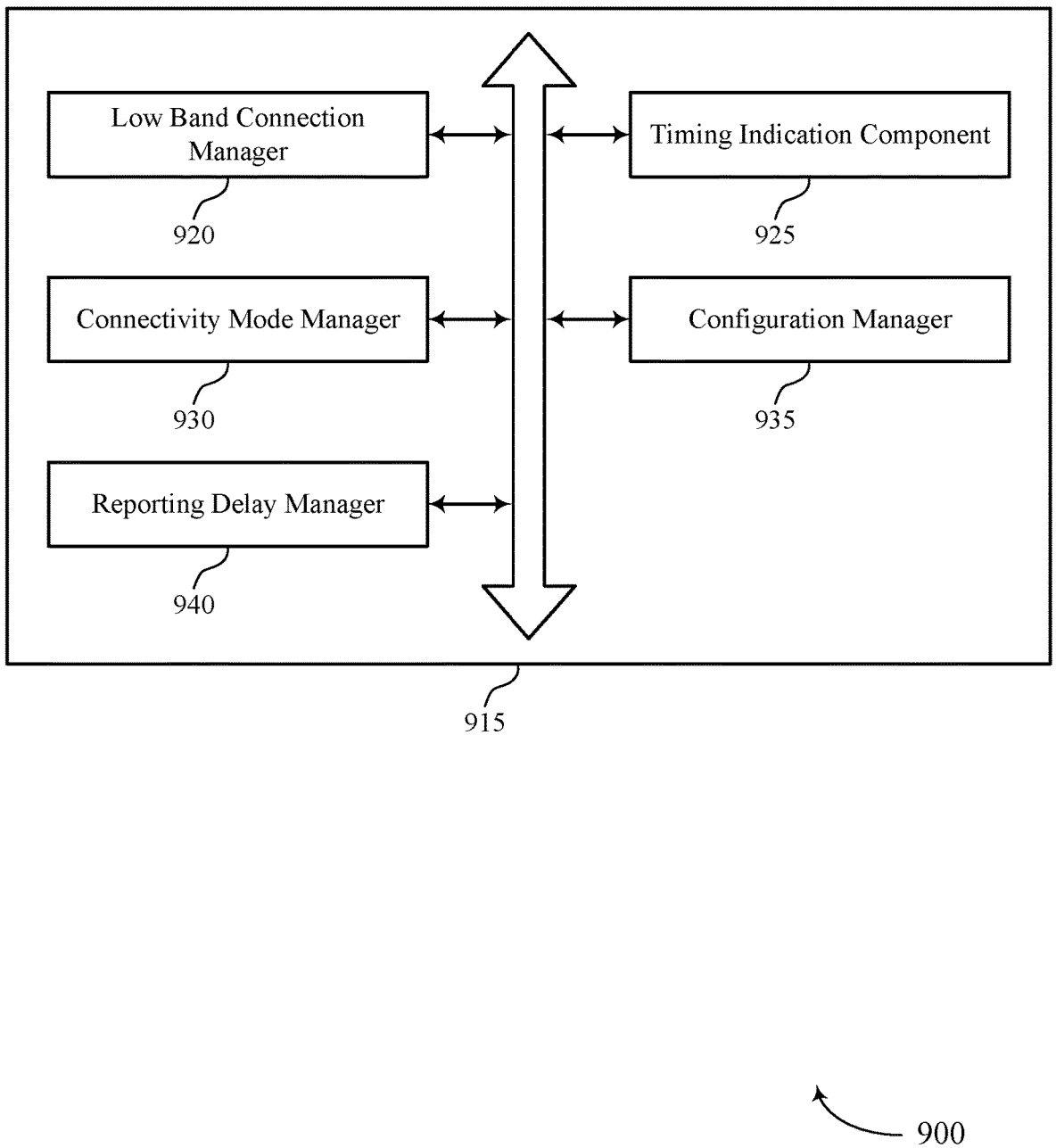

FIG. 9 shows a block diagram 900 of a base station communications manager 915 that supports asynchronous CA in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include low band connection manager 920, timing indication component 925, connectivity mode manager 930, configuration manager 935, and reporting delay manager 940. Each of these modules may communicate, directly or indirectly, with one another (e.g., via one or more buses).

Low band connection manager 920 may establish a first connection with a UE 115 using a first carrier in a first frequency band.

Timing indication component 925 may receive, from the UE 115, a timing difference between transmissions in the first frequency band and one or more transmissions in a second frequency band that is higher than the first frequency band. In some cases, timing indication component 830 may also receive, from the UE 115, one or more updated timing differences. In some cases, the timing difference includes a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof.

Connectivity mode manager 930 may determine that the UE 115 is to use an asynchronous CA mode for communications using a second carrier in the second frequency band based on the timing difference. In some cases, determining that the UE 115 is to use the asynchronous CA mode for communications using the second carrier in the second frequency band based on the timing difference includes comparing the timing difference to a threshold timing difference. In some cases, connectivity mode manager 835 may determine the threshold timing difference based on a subcarrier spacing associated with either the first frequency band or the second frequency band.

Connectivity mode manager 930 may further determine that the UE 115 is to use the asynchronous CA mode for communications using the second carrier in the second frequency band is further based on a frequency difference between the first frequency band and the second frequency band.

Connectivity mode manager 930 may further determine that the UE 115 is to use the asynchronous CA mode for communications using the second carrier in the second frequency band is further based on whether the UE 115 is able to establish an uplink connection on the second carrier. Connectivity mode manager 930 may compare a channel quality metric for the second carrier to a threshold value in order to determine whether the UE 115 is able to establish the uplink connection on the second carrier. Connectivity mode manager 930 may receive from the UE 115 an indication of whether the UE 115 is able to establish the uplink connection on the second carrier. In some cases, connectivity mode manager 930 may configure the UE 115 to attempt a random access procedure via the second carrier using a specified transmit power in order to determine whether the UE 115 is able to establish the uplink connection on the second carrier.

Connectivity mode manager 930 may further determine that the UE 115 is to use the asynchronous CA mode for communications using the second carrier in the second frequency band based on determining whether the second carrier may be aggregated with the first carrier. In some cases, determining whether the second carrier may be aggregated with the first carrier includes determining a quality of a backhaul connection between a first base station 105 corresponding to the first carrier and a second base station 105 corresponding to the second carrier.

Configuration manager 935 may configure the UE 115, based on the determination that the UE 115 is to use the asynchronous CA mode, to observe at least a minimum delay between receiving a packet via the second carrier and reporting an acknowledgement for the packet via the first carrier, configure the UE 115 to report the acknowledgement via a PUSCH or a PUCCH, configure the UE 115 to observe at least the minimum delay at least in part using an RRC protocol, configure the UE 115 to observe at least an updated minimum delay between receiving a subsequent packet via the second carrier and reporting an acknowledgement for the subsequent packet via the first carrier, and configure the UE 115, based on the determination that the UE 115 is to use the asynchronous CA mode, to observe at least a minimum delay between receiving a packet via the second carrier and reporting CSI corresponding to the packet via the first carrier.

Reporting delay manager 940 may determine the minimum delay based on the timing difference, a first subcarrier spacing associated with the first carrier, a second subcarrier spacing associated with the second carrier, or any combination thereof. In some cases, the timing difference includes a timing offset between a first reference slot on the first carrier and a second reference slot on the second carrier, and the method further includes determining the minimum delay based on the timing difference, a first slot duration for the first carrier, a second slot duration for the second carrier, an uplink timing advance for the first carrier, a duration of an uplink portion of a slot in the first carrier, a processing time for the packet, or any combination thereof. In some cases, the timing difference includes a timing offset between a first reference slot on the first carrier and a second reference slot on the second carrier, and configuring the UE 115 to observe at least the minimum delay includes applying a floor function to a quantity based on the timing difference, a first slot duration for the first carrier, a second slot duration for the second carrier, an uplink timing advance for the first carrier, a duration of an uplink portion of a slot in the first carrier, a processing time for the packet, or any combination thereof; reporting delay manager 940 may configure an acknowledgement reporting parameter for the UE 115 based on an output of the floor function. In some cases, the second slot duration for the second carrier is for a downlink portion of a slot in the second carrier. In some cases, the duration of the uplink portion of the slot in the first carrier is based on an amount of uplink data to be transmitted in the slot in the first carrier.

Figure 10:
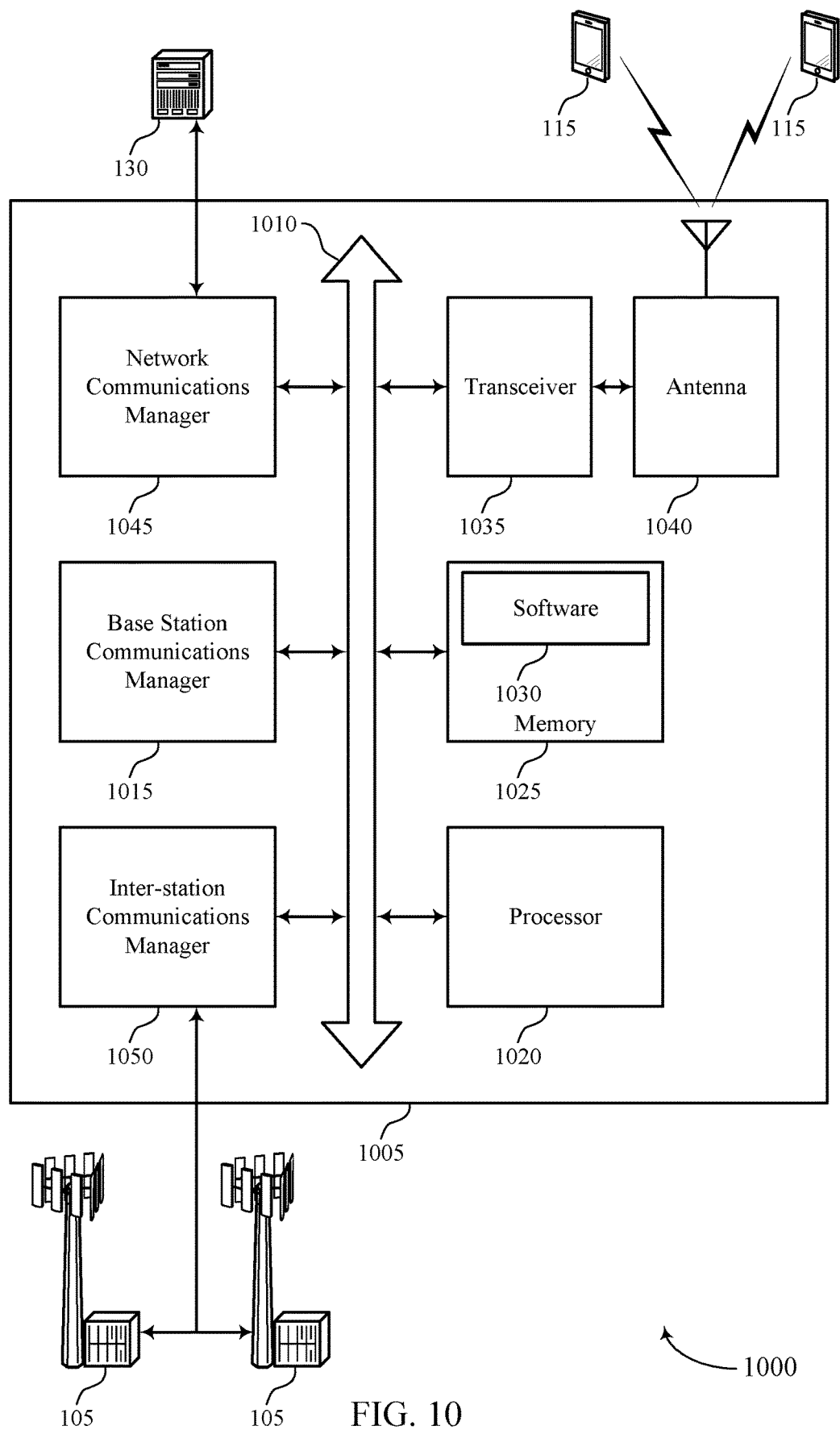
FIG. 10 illustrates a block diagram of a system including a base station that supports asynchronous CA in accordance with aspects of the present disclosure.

FIG. 10 shows a diagram of a system 1000 including a device 1005 that supports asynchronous CA in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting asynchronous CA).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support asynchronous CA. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device 1035 may include a single antenna 1040. However, in some cases the device 1035 may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
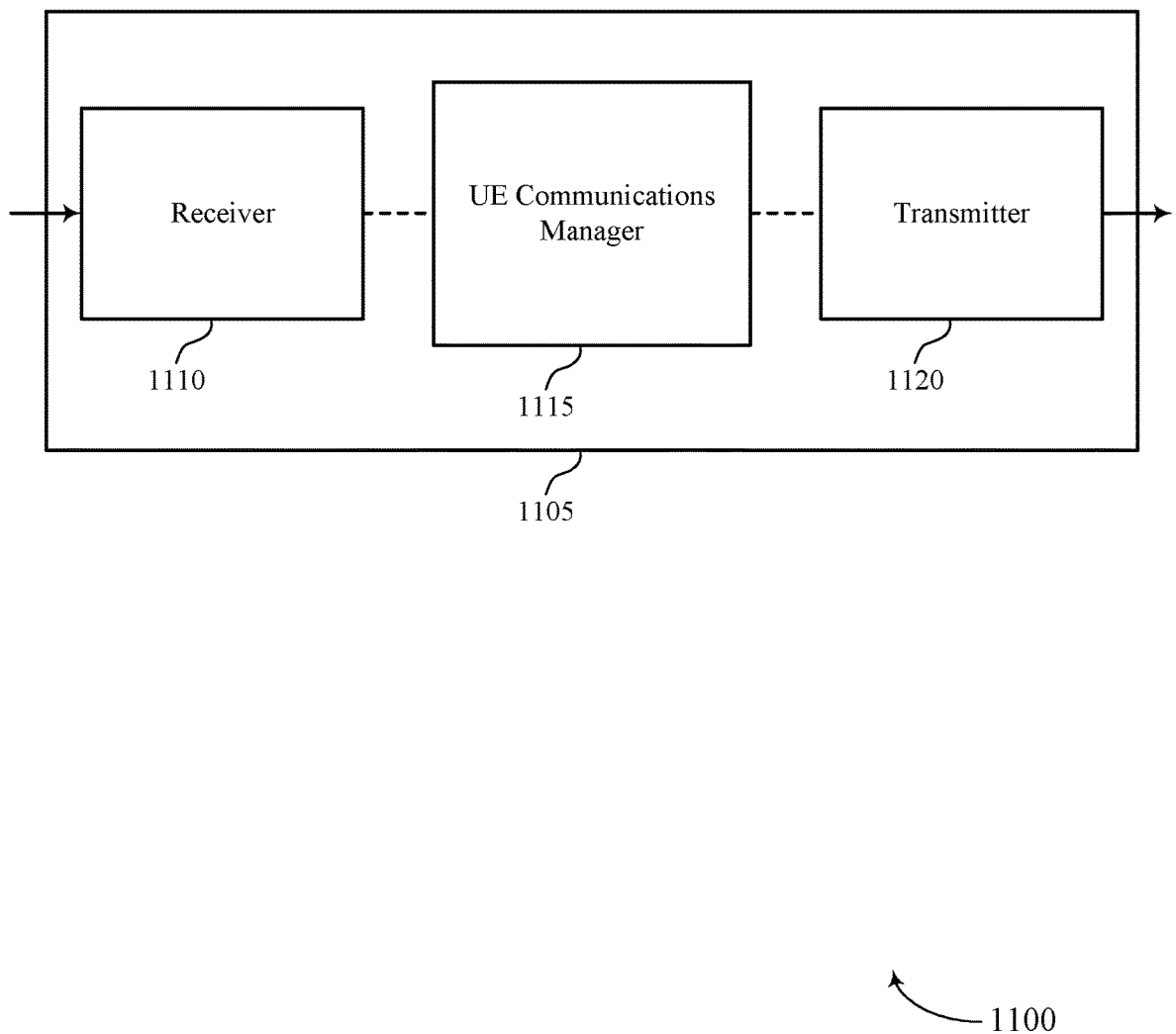
FIGS. 11 through 13 show block diagrams of a device that supports asynchronous CA in accordance with aspects of the present disclosure.

FIG. 11 shows a block diagram 1100 of a wireless device 1105 that supports asynchronous CA in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to asynchronous CA, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may establish a first connection with a base station 105 using a first carrier in a first frequency band, monitor one or more transmissions in a second frequency band, the second frequency band at a higher frequency than the first frequency band, measure a timing difference between transmissions in the first frequency band and one or more of the transmissions in the second frequency band, transmit an indication of the timing difference to the base station, and receive from the base station 105 an indication to use an asynchronous CA mode for communications with a second carrier in the second frequency band.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
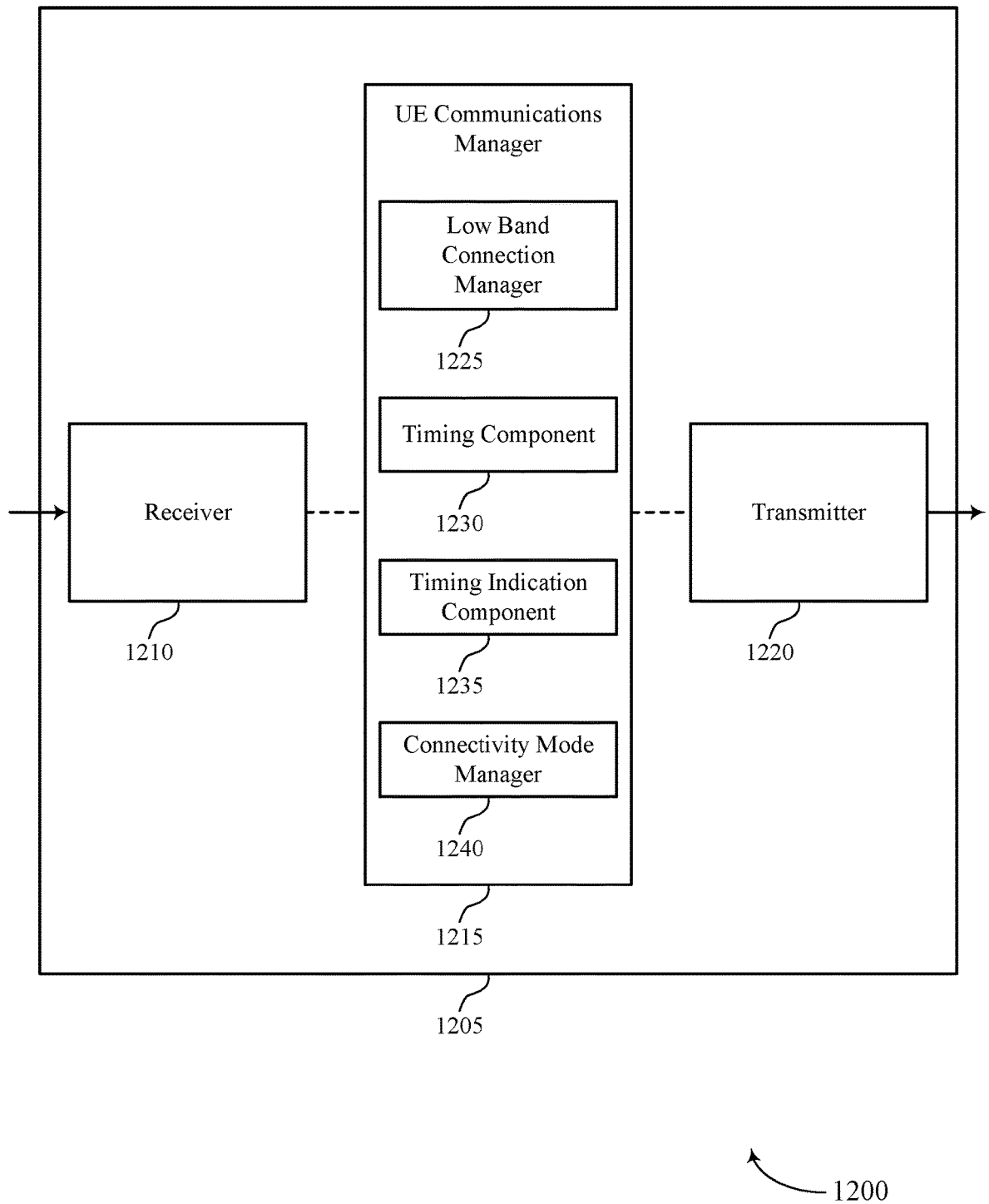

FIG. 12 shows a block diagram 1200 of a wireless device 1205 that supports asynchronous CA in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to asynchronous CA, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include low band connection manager 1225, timing component 1230, timing indication component 1235, and connectivity mode manager 1240.

Low band connection manager 1225 may establish a first connection with a base station 105 using a first carrier in a first frequency band.

Timing component 1230 may monitor one or more transmissions in a second frequency band, the second frequency band at a higher frequency than the first frequency band, and may measure a timing difference between transmissions in the first frequency band and one or more of the transmissions in the second frequency band. Timing component 1230 may measure the timing difference in terms of a sampling rate associated with the second frequency band. In some cases, the timing difference includes a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof. In some cases, measuring the timing difference includes deriving the timing difference based on a common timing reference used to measure timing of transmissions of both the first frequency band and the second frequency band. Timing component 1230 may also measure an uplink timing advance for the first carrier, measure a processing time for the packet, or measure a second slot duration for the second carrier.

Timing indication component 1235 may transmit an indication of the timing difference to the base station. In some cases, the indication of the timing difference is transmitted in a MAC-CE or in a RRC measurement report. Timing indication component 1235 may also transmit an indication of the uplink timing advance to the base station, transmit an indication of the processing time to the base station, and transmit an indication of the second slot duration for the second carrier to the base station. In some cases, timing indication component 1235 may transmit, to the base station, one or more updated timing differences.

Connectivity mode manager 1240 may receive from the base station 105 an indication to use an asynchronous CA mode for communications with a second carrier in the second frequency band.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
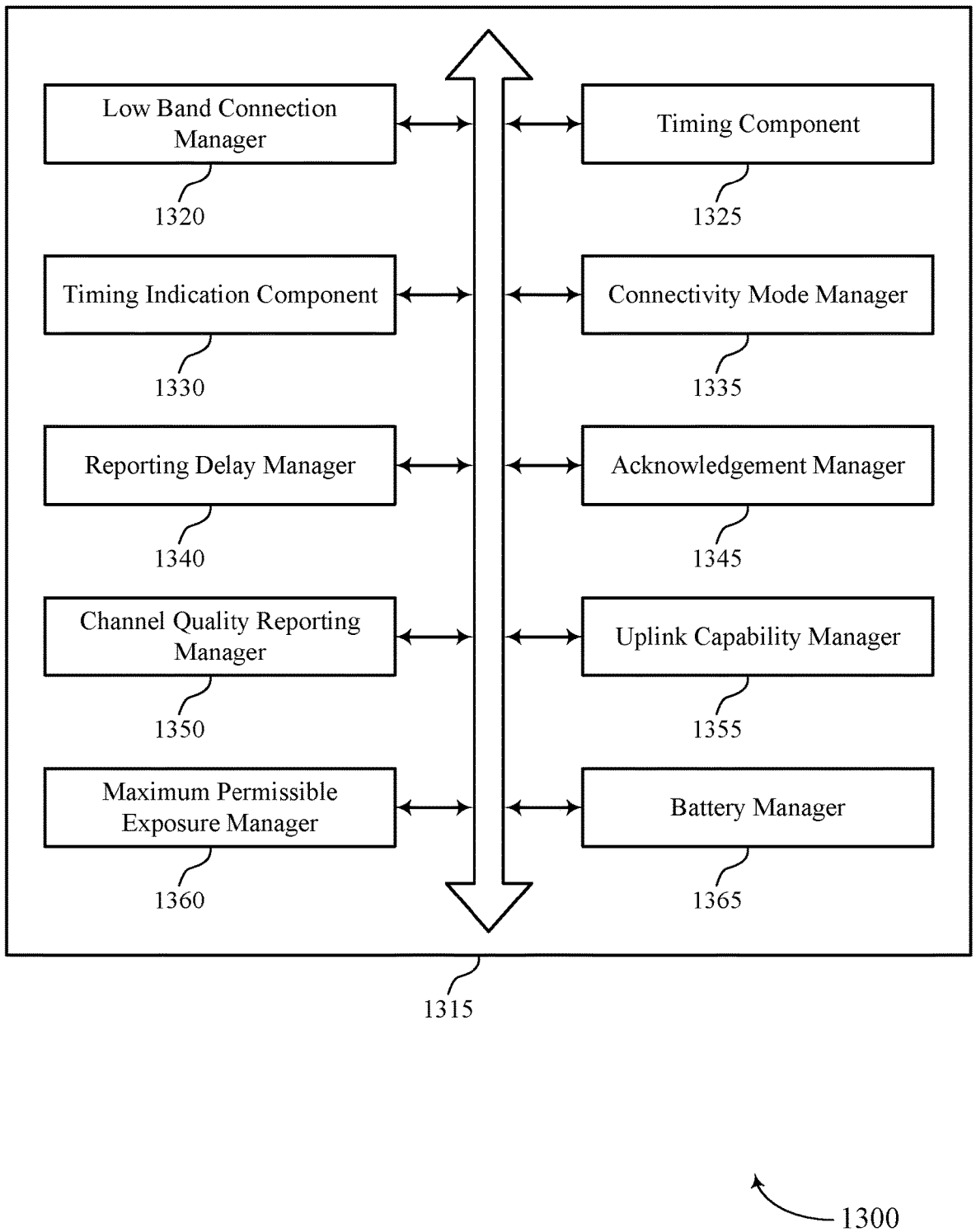

FIG. 13 shows a block diagram 1300 of a UE communications manager 1315 that supports asynchronous CA in accordance with aspects of the present disclosure. The UE communications manager 1315 may be an example of aspects of a UE communications manager 1415 described with reference to FIGS. 11, 12, and 14. The UE communications manager 1315 may include low band connection manager 1320, timing component 1325, timing indication component 1330, connectivity mode manager 1335, reporting delay manager 1340, acknowledgement manager 1345, channel quality reporting manager 1350, uplink capability manager 1355, maximum permissible exposure manager 1360, and battery manager 1365. Each of these modules may communicate, directly or indirectly, with one another (e.g., via one or more buses).

Low band connection manager 1320 may establish a first connection with a base station 105 using a first carrier in a first frequency band.

Timing component 1325 may monitor one or more transmissions in a second frequency band, the second frequency band at a higher frequency than the first frequency band, measure a timing difference between transmissions in the first frequency band and one or more of the transmissions in the second frequency band. In some cases, the timing difference includes a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof. In some cases, measuring the timing difference includes deriving the timing difference based on a common timing reference used to measure timing of transmissions of both the first frequency band and the second frequency band. Timing component 1325 may also measure an uplink timing advance for the first carrier, measure a processing time for the packet, measure a second slot duration for the second carrier, and measure the timing difference in terms of a sampling rate associated with the second frequency band.

Timing indication component 1330 may transmit an indication of the timing difference to the base station, transmit, to the base station, one or more updated timing differences, transmit an indication of the uplink timing advance to the base station, transmit an indication of the processing time to the base station, and transmit an indication of the second slot duration for the second carrier to the base station. In some cases, the indication of the timing difference is transmitted in a MAC-CE or in an RRC measurement report.

Connectivity mode manager 1335 may receive from the base station 105 an indication to use an asynchronous CA mode for communications with a second carrier in the second frequency band.

Reporting delay manager 1340 may receive from the base station 105 a minimum delay to observe between receiving a packet via the second carrier and reporting an acknowledgement for the packet via the first carrier, receive from the base station 105 an updated minimum delay to observe between receiving a subsequent packet via the second carrier and reporting an acknowledgement for the subsequent packet via the first carrier, receive the minimum delay at least in part via a RRC protocol, and receive from the base station 105 a second minimum delay to observe between receiving a packet via the second carrier and reporting CSI corresponding to the packet via the first carrier.

Acknowledgement manager 1345 may report the acknowledgement via a PUSCH or a PUCCH.

Channel quality reporting manager 1350 may transmit to the base station 105 a channel quality metric for the second carrier.

Uplink capability manager 1355 may transmit to the base station 105 an indication of whether the uplink connection on the second carrier is able to be established. In some cases, uplink capability manager 1355 may receive from the base station 105 a specified transmit power, attempt a random access procedure via the second carrier using the specified transmit power, and determine whether the uplink connection on the second carrier is able to be established based on whether the random access procedure is successful.

Maximum permissible exposure manager 1360 may determine whether the uplink connection on the second carrier is able to be established based on comparing a radio frequency exposure level associated with the uplink connection on the second carrier to a maximum permissible exposure level.

Battery manager 1365 may determine whether the uplink connection on the second carrier is able to be established based on comparing a battery charge level associated with a UE 115 to a minimum battery charge level.

Figure 14:
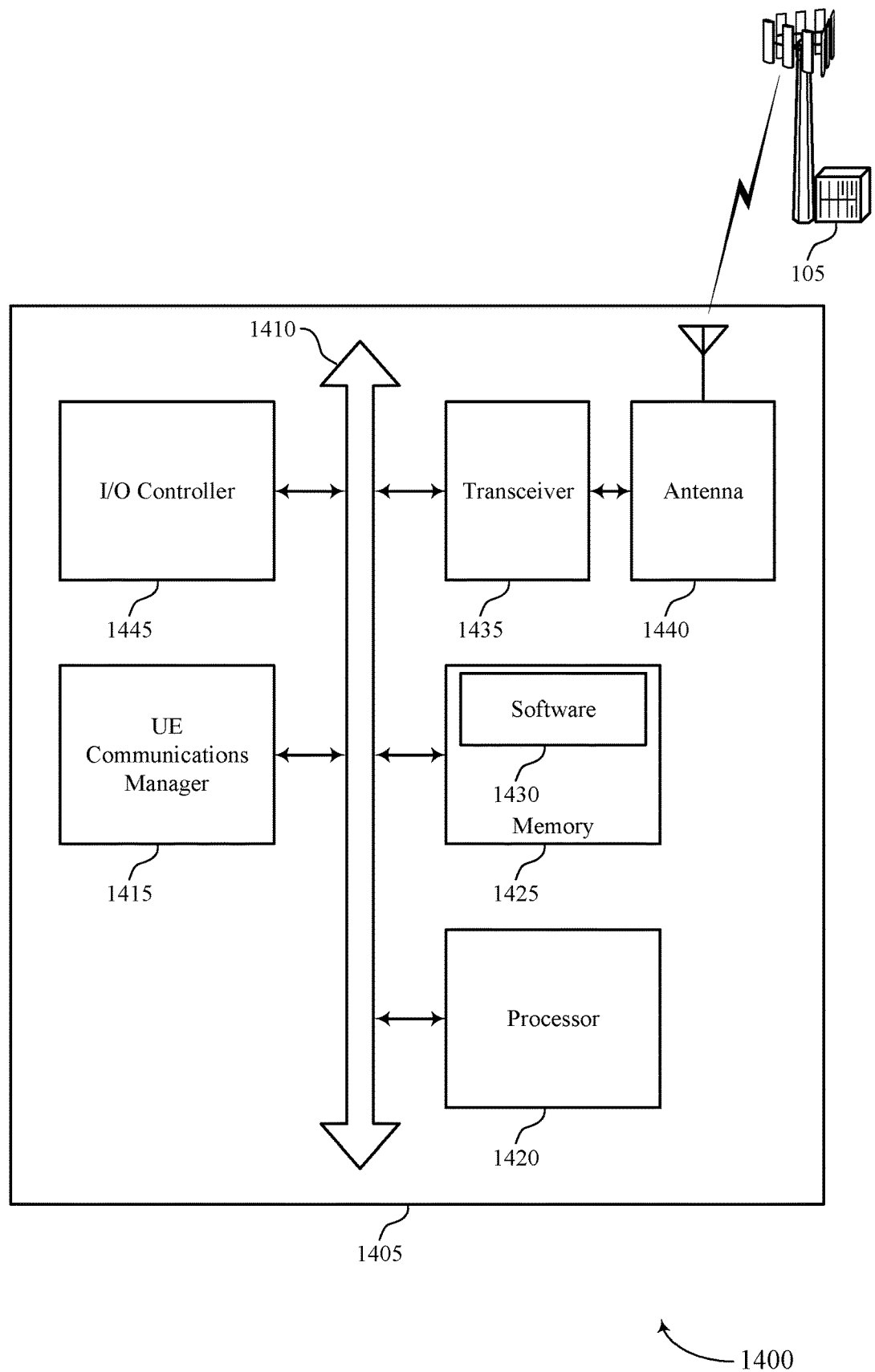
FIG. 14 illustrates a block diagram of a system including a UE that supports asynchronous CA in accordance with aspects of the present disclosure.

FIG. 14 shows a diagram of a system 1400 including a device 1405 that supports asynchronous CA in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting asynchronous CA).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support asynchronous CA. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device 1405 may include a single antenna 1440. However, in some cases the device 1405 may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
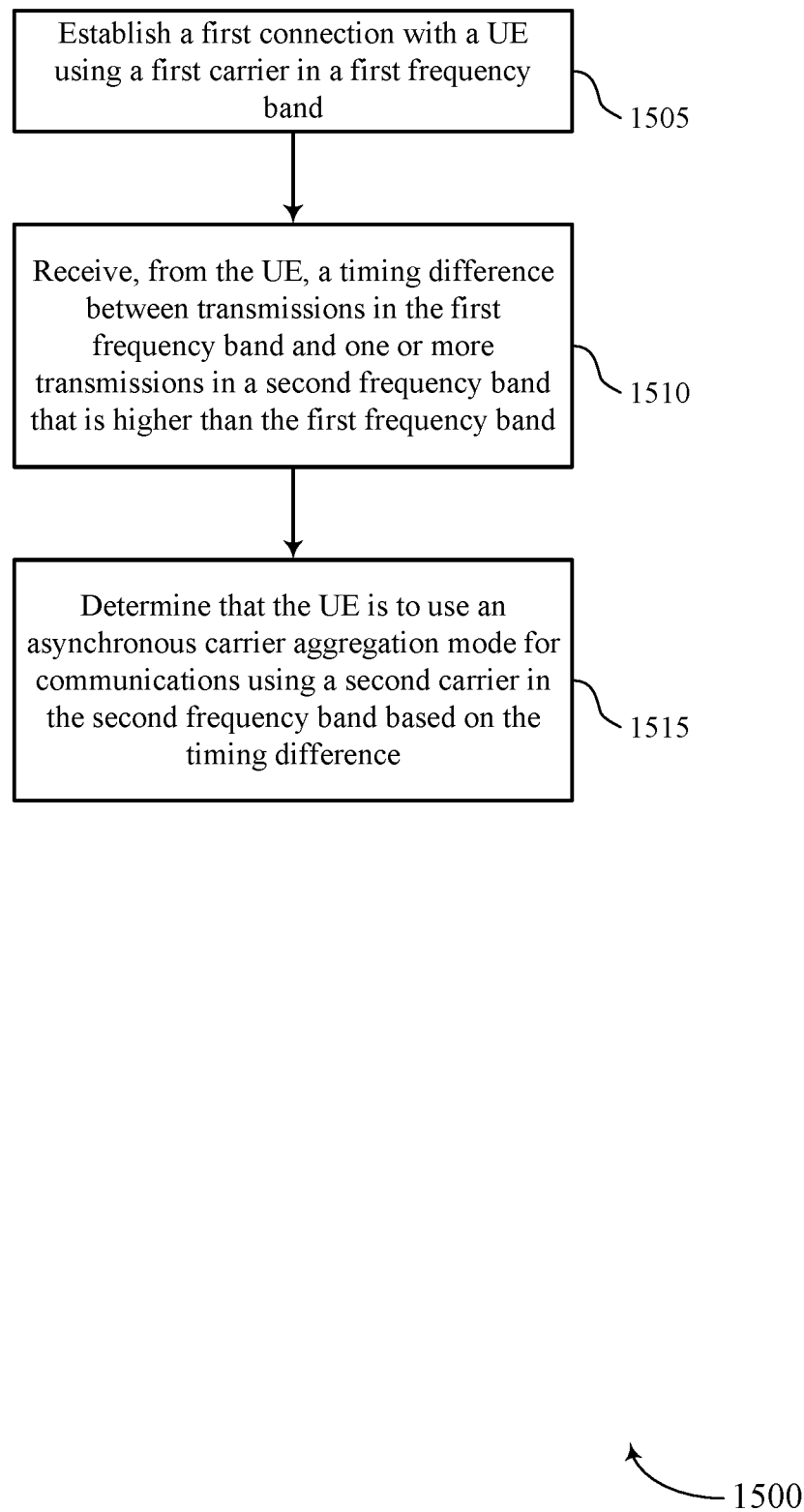
FIGS. 15 through 18 illustrate methods for asynchronous CA in accordance with aspects of the present disclosure.

FIG. 15 shows a flowchart illustrating a method 1500 for asynchronous CA in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1505, the base station 105 may establish a first connection with a user equipment (UE) using a first carrier in a first frequency band. The operations of 1505 may be performed according to the methods described herein. In certain examples, aspects of the operations of 1505 may be performed by a low band connection manager as described with reference to FIGS. 7 through 10.

At 1510, the base station 105 may receive, from the UE 115, a timing difference between transmissions in the first frequency band and one or more transmissions in a second frequency band that is higher than the first frequency band. The operations of 1510 may be performed according to the methods described herein. In certain examples, aspects of the operations of 1510 may be performed by a timing indication component as described with reference to FIGS. 7 through 10.

At 1515, the base station 105 may determine that the UE 115 is to use an asynchronous CA mode for communications using a second carrier in the second frequency band based at least in part on the timing difference. The operations of 1515 may be performed according to the methods described herein. In certain examples, aspects of the operations of 1515 may be performed by a connectivity mode manager as described with reference to FIGS. 7 through 10.

Figure 16:
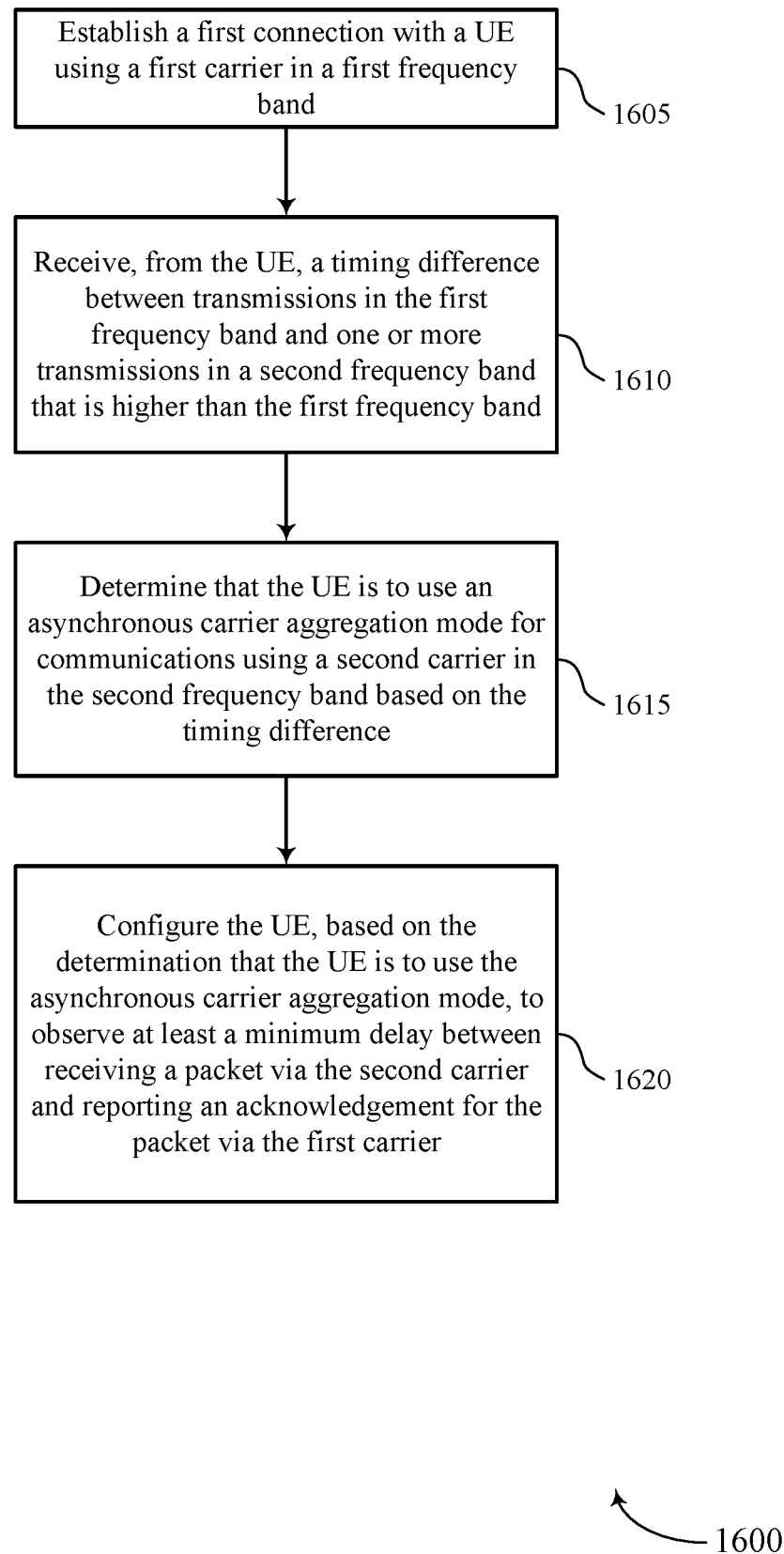

FIG. 16 shows a flowchart illustrating a method 1600 for asynchronous CA in accordance with aspects of the present disclosure. The operations of method 1600 may be implemented by a base station 105 or its components as described herein. For example, the operations of method 1600 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may establish a first connection with a user equipment (UE) using a first carrier in a first frequency band. The operations of 1605 may be performed according to the methods described herein. In certain examples, aspects of the operations of 1605 may be performed by a low band connection manager as described with reference to FIGS. 7 through 10.

At 1610, the base station 105 may receive, from the UE, a timing difference between transmissions in the first frequency band and one or more transmissions in a second frequency band that is higher than the first frequency band. The operations of 1610 may be performed according to the methods described herein. In certain examples, aspects of the operations of 1610 may be performed by a timing indication component as described with reference to FIGS. 7 through 10.

At 1615, the base station 105 may determine that the UE 115 is to use an asynchronous CA mode for communications using a second carrier in the second frequency band based at least in part on the timing difference. The operations of 1615 may be performed according to the methods described herein. In certain examples, aspects of the operations of 1615 may be performed by a connectivity mode manager as described with reference to FIGS. 7 through 10.

At 1620, the base station 105 may configure the UE 115, based at least in part on the determination that the UE 115 is to use the asynchronous CA mode, to observe at least a minimum delay between receiving a packet via the second carrier and reporting an acknowledgement for the packet via the first carrier. The operations of 1620 may be performed according to the methods described herein. In certain examples, aspects of the operations of 1620 may be performed by a configuration manager or reporting delay manager as described with reference to FIGS. 7 through 10.

Figure 17:
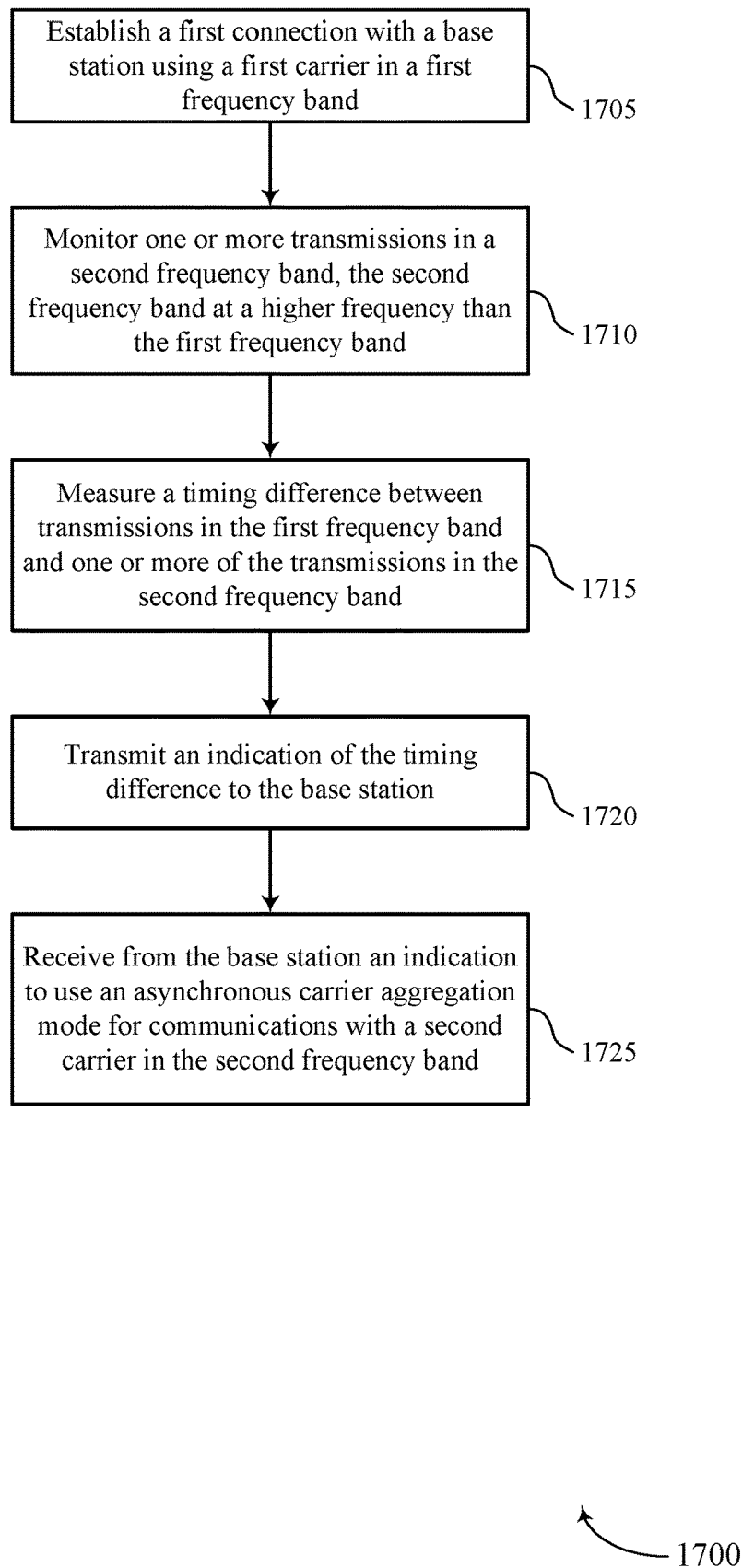

FIG. 17 shows a flowchart illustrating a method 1700 for asynchronous CA in accordance with aspects of the present disclosure. The operations of method 1700 may be implemented by a UE 115 or its components as described herein. For example, the operations of method 1700 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may establish a first connection with a base station 105 using a first carrier in a first frequency band. The operations of 1705 may be performed according to the methods described herein. In certain examples, aspects of the operations of 1705 may be performed by a low band connection manager as described with reference to FIGS. 11 through 14.

At 1710, the UE 115 may monitor one or more transmissions in a second frequency band, the second frequency band at a higher frequency than the first frequency band. The operations of 1710 may be performed according to the methods described herein. In certain examples, aspects of the operations of 1710 may be performed by a timing component as described with reference to FIGS. 11 through 14.

At 1715, the UE 115 may measure a timing difference between transmissions in the first frequency band and one or more of the transmissions in the second frequency band. The operations of 1715 may be performed according to the methods described herein. In certain examples, aspects of the operations of 1715 may be performed by a timing component as described with reference to FIGS. 11 through 14.

At 1720, the UE 115 may transmit an indication of the timing difference to the base station. The operations of 1720 may be performed according to the methods described herein. In certain examples, aspects of the operations of 1720 may be performed by a timing indication component as described with reference to FIGS. 11 through 14.

At 1725, the UE 115 may receive from the base station 105 an indication to use an asynchronous CA mode for communications with a second carrier in the second frequency band. The operations of 1725 may be performed according to the methods described herein. In certain examples, aspects of the operations of 1725 may be performed by a connectivity mode manager as described with reference to FIGS. 11 through 14.

Figure 18:
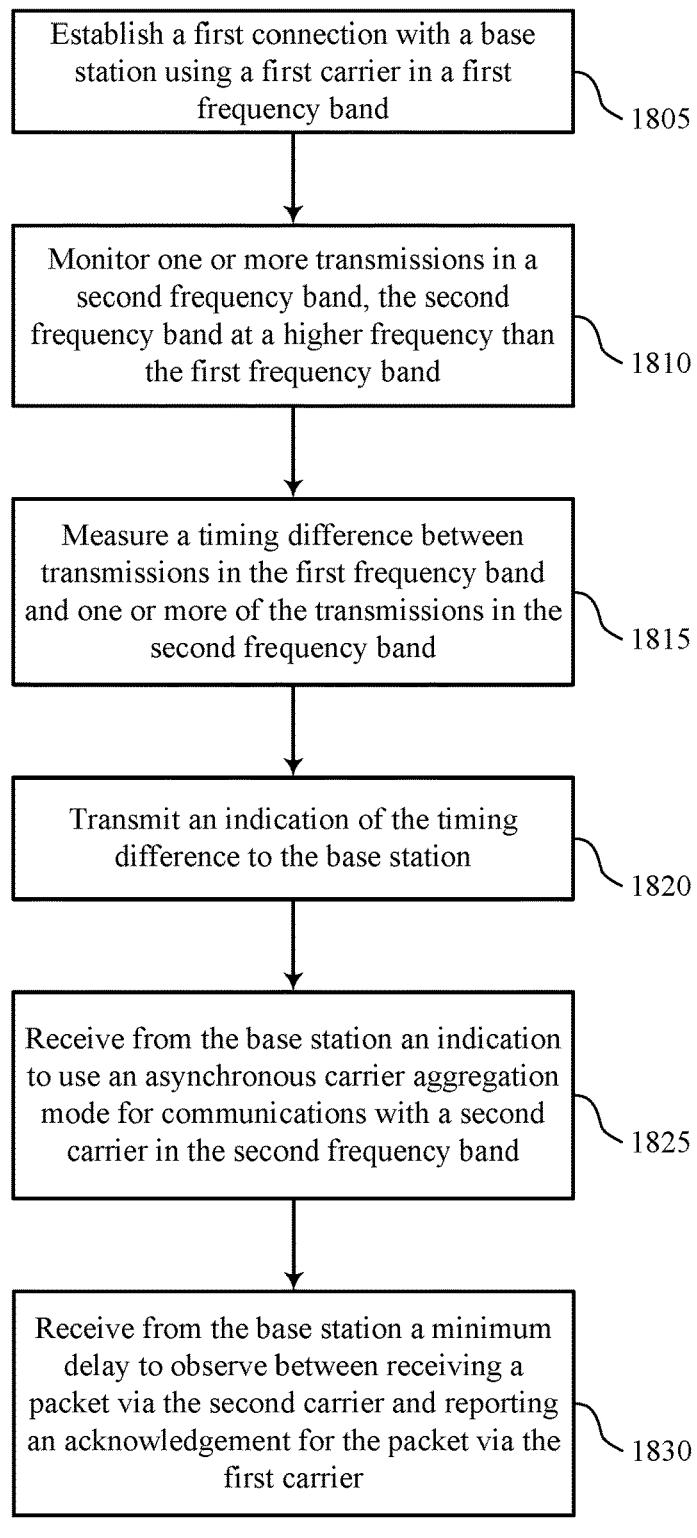

FIG. 18 shows a flowchart illustrating a method 1800 for Asynchronous Carrier Aggregation in accordance with aspects of the present disclosure. The operations of method 1800 may be implemented by a UE 115 or its components as described herein. For example, the operations of method 1800 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may establish a first connection with a base station 105 using a first carrier in a first frequency band. The operations of 1805 may be performed according to the methods described herein. In certain examples, aspects of the operations of 1805 may be performed by a low band connection manager as described with reference to FIGS. 11 through 14.

At 1810, the UE 115 may monitor one or more transmissions in a second frequency band, the second frequency band at a higher frequency than the first frequency band. The operations of 1810 may be performed according to the methods described herein. In certain examples, aspects of the operations of 1810 may be performed by a timing component as described with reference to FIGS. 11 through 14.

At 1815, the UE 115 may measure a timing difference between transmissions in the first frequency band and one or more of the transmissions in the second frequency band. The operations of 1815 may be performed according to the methods described herein. In certain examples, aspects of the operations of 1815 may be performed by a timing component as described with reference to FIGS. 11 through 14.

At 1820, the UE 115 may transmit an indication of the timing difference to the base station. The operations of 1820 may be performed according to the methods described herein. In certain examples, aspects of the operations of 1820 may be performed by a timing indication component as described with reference to FIGS. 11 through 14.

At 1825, the UE 115 may receive from the base station 105 an indication to use an asynchronous carrier aggregation mode for communications with a second carrier in the second frequency band. The operations of 1825 may be performed according to the methods described herein. In certain examples, aspects of the operations of 1825 may be performed by a connectivity mode manager as described with reference to FIGS. 11 through 14.

At 1830, the UE 115 may receive from the base station 105 a minimum delay to observe between receiving a packet via the second carrier and reporting an acknowledgement for the packet via the first carrier. The operations of 1830 may be performed according to the methods described herein. In certain examples, aspects of the operations of 1830 may be performed by a reporting delay manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a base station, comprising:
    establishing a first connection with a user equipment (UE) using a first carrier in a first frequency band;
    receiving, from the UE, an indication of a timing difference between transmissions in the first frequency band and one or more transmissions in a second frequency band that is higher than the first frequency band;
    determining, by the base station after receiving the indication and based at least in part on the timing difference, that the UE is to subsequently establish a second connection for communications using a second carrier in the second frequency band using an asynchronous carrier aggregation mode; and
    transmitting, by the base station and based at least in part on the determination that the UE is to establish the second connection using the asynchronous carrier aggregation mode, an indication to the UE that the UE is to use the asynchronous carrier aggregation mode for communications with the second carrier in the second frequency band.

2. The method of claim 1, further comprising:
    configuring the UE, based at least in part on the determination that the UE is to establish the second connection using the asynchronous carrier aggregation mode, to observe at least a minimum delay between receiving a packet via the second carrier and reporting an acknowledgement for the packet via the first carrier.

3. The method of claim 2, further comprising:
    determining the minimum delay based at least in part on the timing difference, a first subcarrier spacing associated with the first carrier, a second subcarrier spacing associated with the second carrier, or any combination thereof.

4. The method of claim 2, wherein the timing difference comprises a timing offset between a first reference slot on the first carrier and a second reference slot on the second carrier, and the method further comprises:
    determining the minimum delay based at least in part on the timing difference, a first slot duration for the first carrier, a second slot duration for the second carrier, an uplink timing advance for the first carrier, a duration of an uplink portion of a slot in the first carrier, a processing time for the packet, or any combination thereof.

5. The method of claim 2, wherein the timing difference comprises a timing offset between a first reference slot on the first carrier and a second reference slot on the second carrier, and configuring the UE to observe at least the minimum delay comprises:
   applying a floor function to a quantity based at least in part on the timing difference, a first slot duration for the first carrier, a second slot duration for the second carrier, an uplink timing advance for the first carrier, a duration of an uplink portion of a slot in the first carrier, a processing time for the packet, or any combination thereof, wherein the second slot duration for the second carrier is for a downlink portion of a slot in the second carrier, and the duration of the uplink portion of the slot in the first carrier is based at least in part on an amount of uplink data to be transmitted in the slot in the first carrier; and
   configuring an acknowledgement reporting parameter for the UE based at least in part on an output of the floor function.

6. The method of claim 2, further comprising:
   configuring the UE to report the acknowledgement via a physical uplink shared channel (PUSCH) or a physical uplink control channel (PUCCH).

7. The method of claim 2, further comprising:
   configuring the UE to observe at least the minimum delay at least in part using a radio resource control (RRC) protocol.

8. The method of claim 2, further comprising:
   receiving, from the UE, an updated timing difference; and
   configuring the UE to observe at least an updated minimum delay between receiving a subsequent packet via the second carrier and reporting an acknowledgement for the subsequent packet via the first carrier.

9. The method of claim 1, wherein the timing difference comprises a timing offset between a first subframe on the first carrier and a second subframe on the second carrier, a timing offset between a first slot on the first carrier and a second slot on the second carrier, a timing offset between a first symbol on the first carrier and a second symbol on the second carrier, a timing offset between one or more samples corresponding to the first symbol on the first carrier and one or more samples corresponding to the second symbol on the second carrier, or any combination thereof.

10. The method of claim 1, further comprising:
    configuring the UE, based at least in part on the determination that the UE is to establish the second connection using the asynchronous carrier aggregation mode, to observe at least a minimum delay between receiving a packet via the second carrier and reporting channel state information (CSI) corresponding to the packet via the first carrier.

11. The method of claim 1, wherein determining, based at least in part on the timing difference, that the UE is to establish the second connection using the asynchronous carrier aggregation mode comprises:
    comparing the timing difference to a threshold timing difference; and
    determining the threshold timing difference based at least in part on a subcarrier spacing associated with either the first frequency band or the second frequency band.

12. The method of claim 1, wherein determining, based at least in part on the timing difference, that the UE is to establish the second connection using the asynchronous carrier aggregation mode is further based at least in part on a frequency difference between the first frequency band and the second frequency band.

13. The method of claim 1, wherein determining, based at least in part on the timing difference, that the UE is to establish the second connection using the asynchronous carrier aggregation mode is further based at least in part on whether the UE is able to establish an uplink connection on the second carrier, and the method further comprising at least one of:
    comparing a channel quality metric for the second carrier to a threshold value in order to determine whether the UE is able to establish the uplink connection on the second carrier;
    receiving from the UE an indication of whether the UE is able to establish the uplink connection on the second carrier; or
    configuring the UE to attempt a random access procedure via the second carrier using a specified transmit power in order to determine whether the UE is able to establish the uplink connection on the second carrier.

14. The method of claim 1, wherein determining, based at least in part on the timing difference, that the UE is to establish the second connection using the asynchronous carrier aggregation mode comprises:
    determining whether the second carrier may be aggregated with the first carrier based at least in part on determining a quality of a backhaul connection between a first base station corresponding to the first carrier and a second base station corresponding to the second carrier.

15. A method for wireless communication, comprising:
    establishing a first connection with a base station using a first carrier in a first frequency band;
    monitoring one or more transmissions in a second frequency band, the second frequency band at a higher frequency than the first frequency band;
    measuring a timing difference between transmissions in the first frequency band and one or more of the transmissions in the second frequency band;
    transmitting an indication of the timing difference to the base station;
    receiving from the base station, after transmitting the indication of the timing difference, an indication to subsequently use an asynchronous carrier aggregation mode for communications using a second carrier in the second frequency band; and
    establishing, after receiving the indication to use the asynchronous carrier aggregation mode, a second connection for using the second carrier and the asynchronous carrier aggregation mode.

16. The method of claim 15, further comprising:
    receiving from the base station a minimum delay to observe between receiving a packet via the second carrier and reporting an acknowledgement for the packet via the first carrier.

17. The method of claim 16, further comprising:
    transmitting, to the base station, an updated timing difference; and
    receiving from the base station an updated minimum delay to observe between receiving a subsequent packet via the second carrier and reporting an acknowledgement for the subsequent packet via the first carrier.

18. The method of claim 16, further comprising:
    measuring at least one of an uplink timing advance for the first carrier, a processing time for the packet, or a second slot duration for the second carrier;

transmitting an indication of at least one of the uplink timing advance, the processing time, or the second slot duration for the second carrier to the base station.

19. The method of claim 16, further comprising:
reporting the acknowledgement via a physical uplink shared channel (PUSCH) or a physical uplink control channel (PUCCH).

20. The method of claim 16, further comprising:
receiving the minimum delay at least in part via a radio resource control (RRC) protocol.

21. The method of claim 15, further comprising:
receiving from the base station a second minimum delay to observe between receiving a packet via the second carrier and reporting channel state information (CSI) corresponding to the packet via the first carrier.

22. The method of claim 15, wherein measuring the timing difference comprises:
deriving the timing difference based at least in part on a common timing reference used to measure timing of transmissions of both the first frequency band and the second frequency band.

23. The method of claim 15, further comprising:
measuring the timing difference in terms of a sampling rate associated with the second frequency band.

24. The method of claim 15, further comprising:
transmitting to the base station a channel quality metric for the second carrier.

25. The method of claim 15, further comprising:
transmitting to the base station an indication of whether an uplink connection on the second carrier is able to be established.

26. The method of claim 25, further comprising:
determining whether the uplink connection on the second carrier is able to be established based at least in part on at least one of comparing a radio frequency exposure level associated with the uplink connection on the second carrier to a maximum permissible exposure level or comparing a battery charge level associated with a UE to a minimum battery charge level.

27. The method of claim 25, further comprising:
receiving from the base station a specified transmit power;
attempting a random access procedure via the second carrier using the specified transmit power; and
determining whether the uplink connection on the second carrier is able to be established based at least in part on whether the random access procedure is successful.

28. The method of claim 15, wherein the indication of the timing difference is transmitted in a medium access control (MAC) control element (MAC-CE) or in a radio resource control (RRC) measurement report.

29. An apparatus for wireless communication, comprising:
a processor;
memory in electronic communication with the processor; and
instructions stored in the memory and executable by the processor to cause the apparatus to:
establish a first connection with a user equipment (UE) using a first carrier in a first frequency band;
receive, from the UE, an indication of a timing difference between transmissions in the first frequency band and one or more transmissions in a second frequency band that is higher than the first frequency band;
determine, by the apparatus after receiving the indication and based at least in part on the timing difference, that the UE is to subsequently establish a second connection for communications using a second carrier in the second frequency band using an asynchronous carrier aggregation mode; and
transmit, by the apparatus and based at least in part on the determination that the UE is to establish the second connection using the asynchronous carrier aggregation mode, an indication to the UE that the UE is to use the asynchronous carrier aggregation mode for communications with the second carrier in the second frequency band.

30. An apparatus for wireless communication, comprising:
a processor;
memory in electronic communication with the processor; and
instructions stored in the memory and executable by the processor to cause the apparatus to:
establish a first connection with a base station using a first carrier in a first frequency band;
monitor one or more transmissions in a second frequency band, the second frequency band at a higher frequency than the first frequency band;
measure a timing difference between transmissions in the first frequency band and one or more of the transmissions in the second frequency band;
transmit an indication of the timing difference to the base station;
receive from the base station, after transmitting the indication of the timing difference, an indication to subsequently use an asynchronous carrier aggregation mode for communications using a second carrier in the second frequency band; and
establish, after receiving the indication to use the asynchronous carrier aggregation mode, a second connection for using the second carrier and the asynchronous carrier aggregation mode.

* * * * *